US010855924B2

(12) United States Patent
Noda

(10) Patent No.: US 10,855,924 B2
(45) Date of Patent: Dec. 1, 2020

(54) ELECTRONIC DEVICE, CONTROL METHOD THEREOF, AND STORAGE MEDIUM FOR SETTING EXPOSURE CONTROL PARAMETER

(71) Applicant: CANON KABUSHIKI KAISHA, Tokyo (JP)

(72) Inventor: Hiroshi Noda, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/394,235

(22) Filed: Apr. 25, 2019

(65) Prior Publication Data

US 2019/0335111 A1    Oct. 31, 2019

(30) Foreign Application Priority Data

Apr. 27, 2018    (JP) ................. 2018-087543

(51) Int. Cl.
| | | |
|---|---|---|
| *H04N 5/232* | (2006.01) | |
| *H04N 5/243* | (2006.01) | |
| *H04N 5/235* | (2006.01) | |
| *H04N 5/238* | (2006.01) | |
| *G03B 7/00* | (2014.01) | |

(52) U.S. Cl.
CPC ... *H04N 5/232939* (2018.08); *H04N 5/23216* (2013.01)

(58) Field of Classification Search
CPC ......... H04N 5/232939; H04N 5/23216; H04N 5/243; H04N 5/2353; H04N 5/238; H04N 5/232933; H04N 5/23245; H04N 5/23293; G03B 7/003
See application file for complete search history.

(56) References Cited

U.S. PATENT DOCUMENTS

| | | | | | |
|---|---|---|---|---|---|
| 4,304,472 | A | * | 12/1981 | Shinoda ................. | G03B 7/091 396/292 |
| 4,816,855 | A | * | 3/1989 | Kitaura .................... | G03B 7/16 396/57 |
| 4,952,859 | A | * | 8/1990 | Torisawa ............... | H02K 37/14 310/49.27 |

(Continued)

FOREIGN PATENT DOCUMENTS

| | | |
|---|---|---|
| CN | 106412418 A | 2/2017 |
| JP | 08-166631 A | 6/1996 |

OTHER PUBLICATIONS

Sekonic L-478D LiteMaster Pro Instruction Manual—Jun. 2018—70 pgs.

(Continued)

*Primary Examiner* — Albert H Cutler
(74) *Attorney, Agent, or Firm* — Cowan, Liebowitz & Latman, P.C.

(57) ABSTRACT

There is provided an electronic device. A setting unit is able to set a setting value for at least one exposure control parameter among aperture, shutter speed, and ISO sensitivity in 1/n-stop increments (where n is an integer greater than or equal to 8). A display control unit carries out control so that the setting value for the exposure control parameter set in 1/n-stop increments is displayed as a numerical value in one-stop increments and a fraction serving as a stop expression indicative of a stop that is less than one stop.

18 Claims, 26 Drawing Sheets

(56) References Cited

U.S. PATENT DOCUMENTS

| | | | | |
|---|---|---|---|---|
| 5,025,403 A * | 6/1991 | Stephens | ............. | G06F 15/0225 |
| | | | | 708/137 |
| 5,608,490 A * | 3/1997 | Ogawa | ................... | G03B 29/00 |
| | | | | 348/E5.042 |
| 6,667,765 B1 * | 12/2003 | Tanaka | ................. | H04N 5/2352 |
| | | | | 348/229.1 |
| 2017/0034440 A1 * | 2/2017 | Fukushima | .......... | H04N 5/2353 |

OTHER PUBLICATIONS

The above reference was cited in a Oct. 1, 2019 Great Britain Search Report, which is enclosed, that issued in Great Britain Patent Application No. 1905417.0.

The above documents were cited in a Sep. 24, 2020 Chinese Office Action, a copy of which is enclosed with an English Translation, that issued in Chinese Patent Application No. 201910323437.1.

* cited by examiner

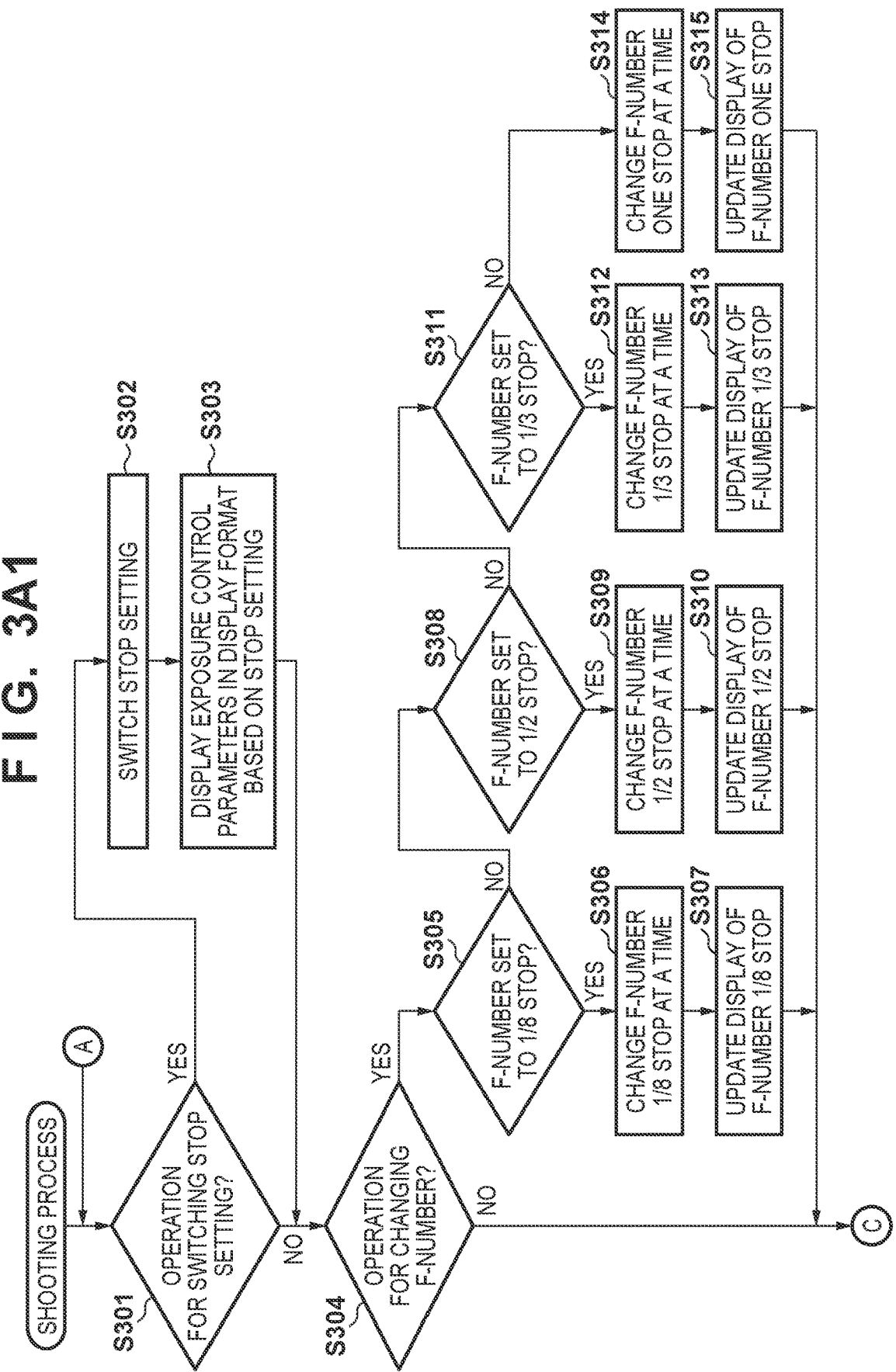
FIG. 3A1

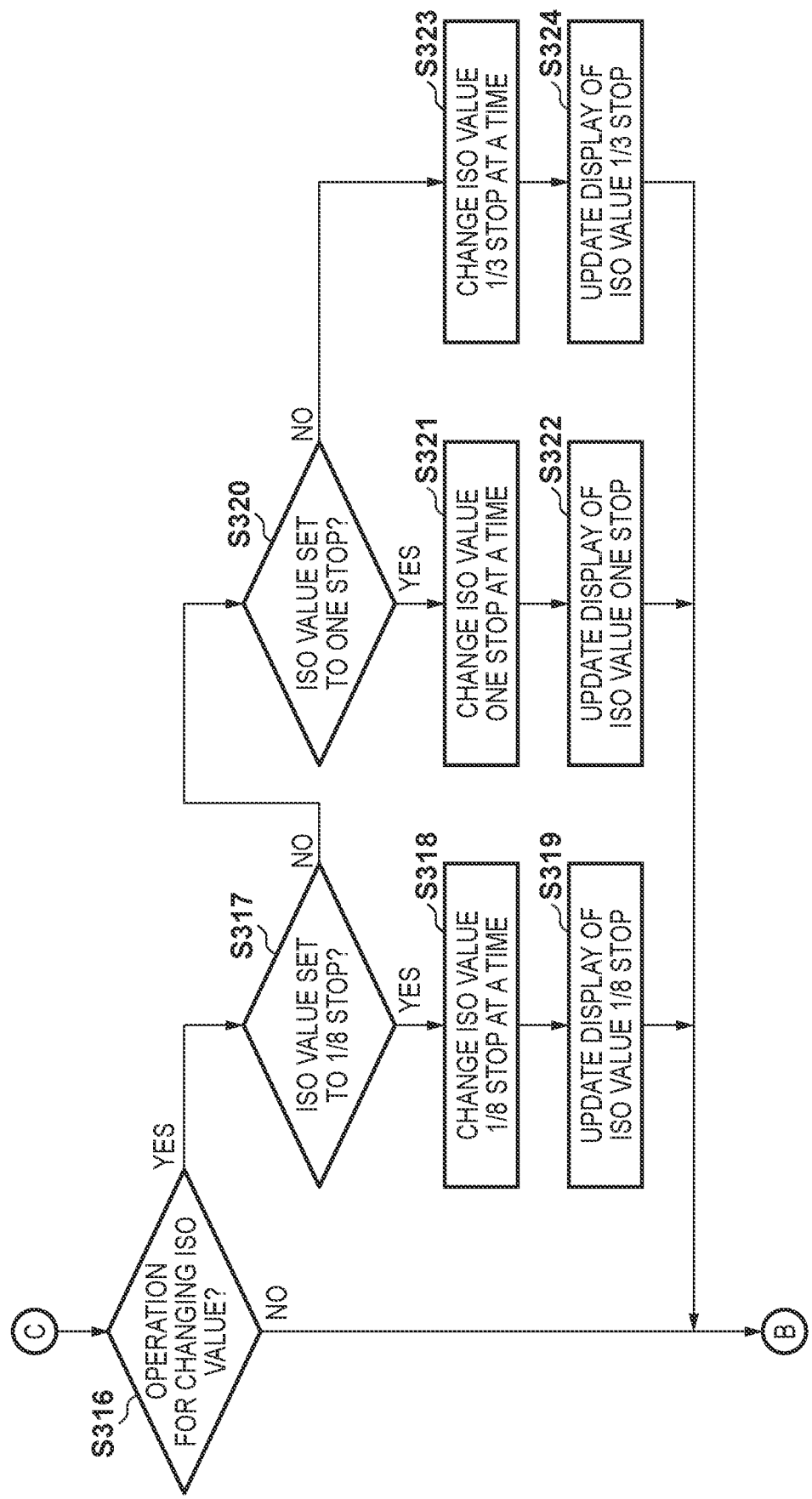
FIG. 3A2

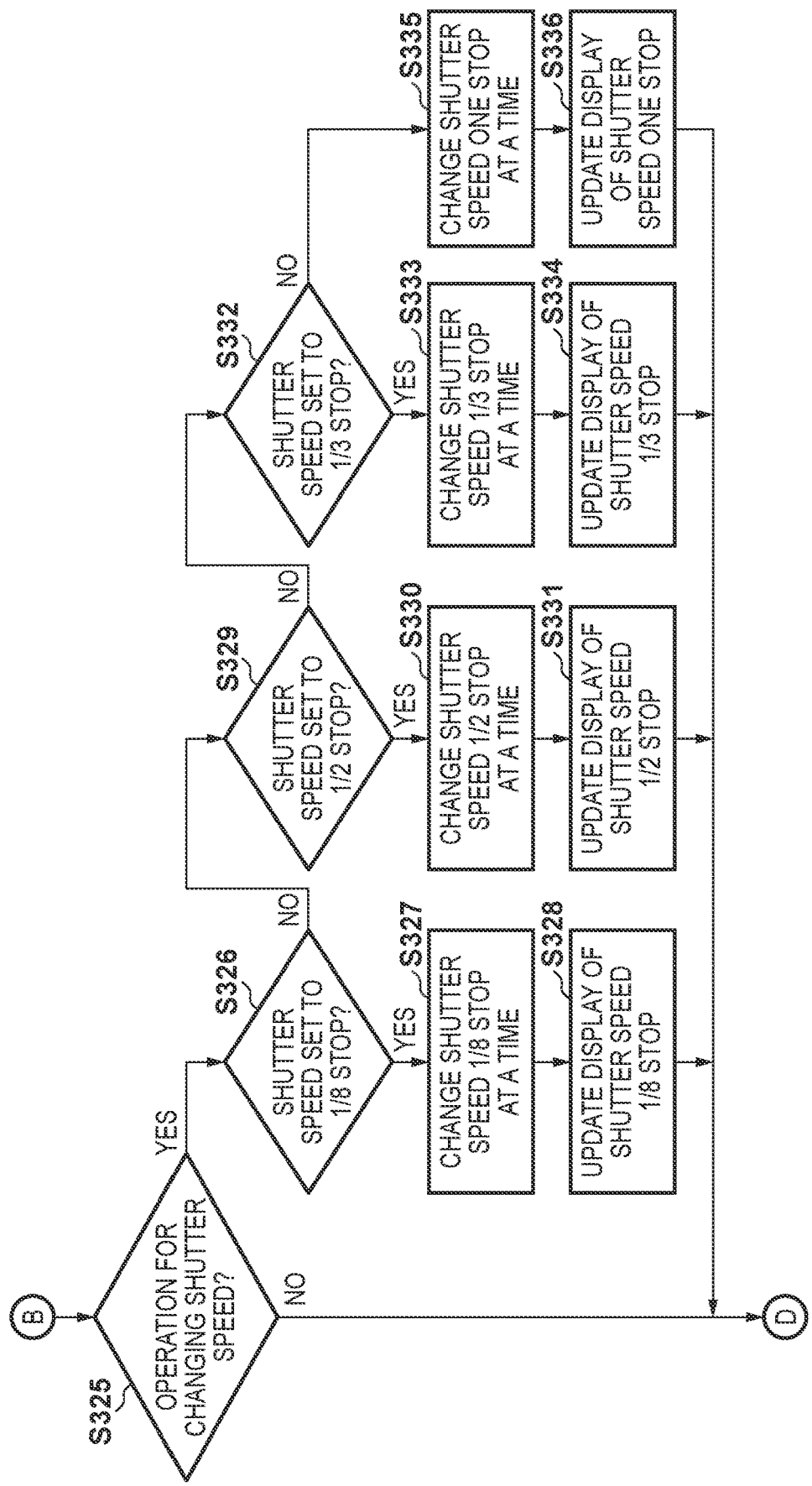
FIG. 3B1

FIG. 3B2
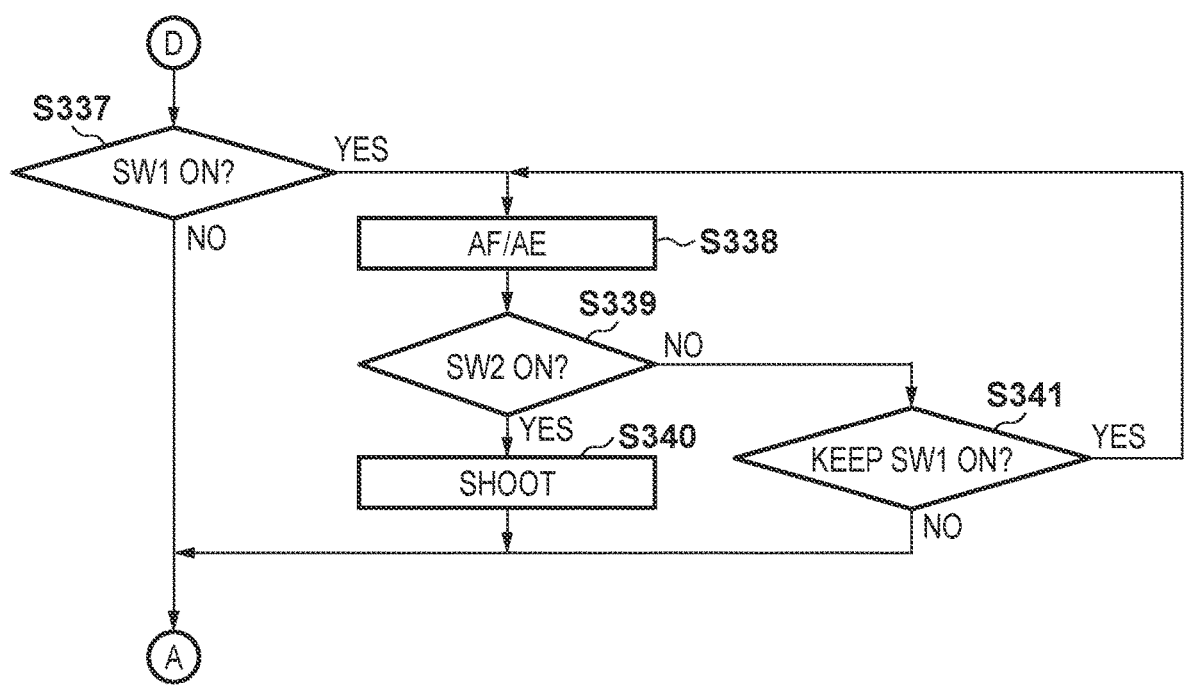

FIG. 3C

| ● | AF | ▷ | 👕 | 🏢 | ☆ |

■☐☐☐☐☐  SHOOT1

| EXPOSURE SETTING INCREMENTS | ☐ ONE STOP | ☐ 1/2 STOP | ■ 1/3 STOP |
| ISO SENSITIVITY SETTING INCREMENTS | ☐ ONE STOP | ■ 1/3 STOP | |
| 1/8 STOP SETTING | ☐ YES | ■ NO | |
| ELECTRONIC SOUND | ON | | |
| SHOT IMAGE CONFIRMATION TIME: 2 SECONDS | | | |
| EXTERNAL FLASH CONTROL | | | |

FIG. 6

| No | F-NUMBER (1/8-STOP INCREMENTS) | DISPLAY FORMAT |
|---|---|---|
| 0(N Min) | F1.0 | 1.0 |
| 1 | F1.0 AND 1/8 STOP | 1.0 1/8 |
| ... | ... | ... |
| 4 | F1.2 (F1.0 AND 4/8 STOP (=1/2 STOP)) | 1.0 4/8 |
| ... | ... | ... |
| 8 | F1.4 | 1.4 |
| 9 | F1.4 AND 1/8 STOP | 1.4 1/8 |
| ... | ... | ... |
| 12 | F1.8(F1.4 AND 4/8 STOP (=1/2 STOP)) | 1.4 4/8 |
| ... | ... | ... |
| 16 | F2.0 | 2.0 |
| 17 | F2.0 AND 1/8 STOP | 2.0 1/8 |
| ... | ... | ... |
| 20 | F2.5(F2.0 AND 4/8 STOP (=1/2 STOP)) | 2.0 4/8 |
| ... | ... | ... |
| 24 | F2.8 | 2.8 |
| 25 | F2.8 AND 1/8 STOP | 2.8 1/8 |
| ... | ... | ... |
| 28 | F3.5(F2.8 AND 4/8 STOP (=1/2 STOP)) | 2.8 4/8 |
| ... | ... | ... |
| 32 | F4.0 | 4.0 |
| 33 | F4.0 AND 1/8 STOP | 4.0 1/8 |
| ... | ... | ... |
| 36 | F4.5(F4.0 AND 4/8 STOP (=1/2 STOP)) | 4.0 4/8 |
| ... | ... | ... |
| 40 | F5.6 | 5.6 |
| 41 | F5.6 AND 1/8 STOP | 5.6 1/8 |
| ... | ... | ... |
| 44 | F6.7(F5.6 AND 4/8 STOP (=1/2 STOP)) | 5.6 4/8 |
| ... | ... | ... |
| 48 | F8.0 | 8.0 |
| 49 | F8.0 AND 1/8 STOP | 8.0 1/8 |
| ... | ... | ... |
| 52 | F9.5(F8.0 AND 4/8 STOP (=1/2 STOP)) | 8.0 4/8 |
| ... | ... | ... |
| 56 | F11 | 11 |
| 57 | F11 AND 1/8 STOP | 11 1/8 |
| ... | ... | ... |
| 60 | F13(F11 AND 4/8 STOP (=1/2 STOP)) | 11 4/8 |
| ... | ... | ... |
| 64 | F16 | 16 |
| 65 | F16 AND 1/8 STOP | 16 1/8 |
| ... | ... | ... |
| 68 | F19(F16 AND 4/8 STOP (=1/2 STOP)) | 16 4/8 |
| ... | ... | ... |

FIG. 7

| No | ISO VALUE (1/8-STOP INCREMENTS) | DISPLAY FORMAT |
|---|---|---|
| 0(N Min) | 50 | 50 |
| 1 | 100 | 100 |
| 2 | 100 AND 1/8 STOP | 100 1/8 |
| ... | ... | ... |
| 5 | 100 AND 4/8 STOP | 100 4/8 |
| ... | ... | ... |
| 9 | 200 | 200 |
| 10 | 200 AND 1/8 STOP | 200 1/8 |
| ... | ... | ... |
| 13 | 200 AND 4/8 STOP | 200 4/8 |
| ... | ... | ... |
| 17 | 400 | 400 |
| 18 | 400 AND 1/8 STOP | 400 1/8 |
| ... | ... | ... |
| 21 | 400 AND 4/8 STOP | 400 4/8 |
| ... | ... | ... |
| 25 | 800 | 800 |
| 26 | 800 AND 1/8 STOP | 800 1/8 |
| ... | ... | ... |
| 29 | 800 AND 4/8 STOP | 800 4/8 |
| ... | ... | ... |
| 33 | 1600 | 1600 |
| 34 | 1600 AND 1/8 STOP | 1600 1/8 |
| ... | ... | ... |
| 37 | 1600 AND 4/8 STOP | 1600 4/8 |
| ... | ... | ... |
| 41 | 3200 | 3200 |
| 42 | 3200 AND 1/8 STOP | 3200 1/8 |
| ... | ... | ... |
| 45 | 3200 AND 4/8 STOP | 3200 4/8 |
| ... | ... | ... |
| 49 | 6400 | 6400 |
| 50 | 6400 AND 1/8 STOP | 6400 1/8 |
| ... | ... | ... |
| 53 | 6400 AND 4/8 STOP | 6400 4/8 |
| ... | ... | ... |

FIG. 8A

| No | SHUTTER SPEED (1/8-STOP INCREMENTS) | DISPLAY FORMAT |
|---|---|---|
| 0(N Min) | 30 SEC | 30" |
| 1 | 30 SEC AND 1/8 STOP | 30"1/8 |
| ... | ... | ... |
| 4 | 20 SEC (30 SEC AND 4/8 STOP (= 1/2 STOP)) | 30"4/8 |
| ... | ... | ... |
| 8 | 15 SEC | 15" |
| 9 | 15 SEC AND 1/8 STOP | 15"1/8 |
| ... | ... | ... |
| 12 | 10 SEC (15 SEC AND 4/8 STOP (= 1/2 STOP)) | 15"4/8 |
| ... | ... | ... |
| 16 | 8 SEC | 8" |
| 17 | 8 SEC AND 1/8 STOP | 8"1/8 |
| ... | ... | ... |
| 20 | 6 SEC (8 SEC AND 4/8 STOP (= 1/2 STOP)) | 8"4/8 |
| ... | ... | ... |
| 24 | 4 SEC | 4" |
| 25 | 4 SEC AND 1/8 STOP | 4"1/8 |
| ... | ... | ... |
| 28 | 3 SEC (4 SEC AND 4/8 STOP (= 1/2 STOP)) | 4"4/8 |
| ... | ... | ... |
| 32 | 2 SEC | 2" |
| 33 | 2 SEC AND 1/8 STOP | 2"1/8 |
| ... | ... | ... |
| 36 | 1.5 SEC (2 SEC AND 4/8 STOP (= 1/2 STOP)) | 2"4/8 |
| ... | ... | ... |
| 40 | 1 SEC | 1" |
| 41 | 1 SEC AND 1/8 STOP | 1"1/8 |
| ... | ... | ... |
| 44 | 0.7 SEC (1 SEC AND 4/8 STOP (= 1/2 STOP)) | 1"4/8 |
| ... | ... | ... |
| 48 | 0.5 SEC | 0"5 |
| 49 | 0.5 SEC AND 1/8 STOP | 0"5 1/8 |
| ... | ... | ... |
| 52 | 0.3 SEC (0.5 SEC AND 4/8 STOP (= 1/2 STOP)) | 0"5 4/8 |
| ... | ... | ... |

FIG. 8B

| No | SHUTTER SPEED (1/8-STOP INCREMENTS) | DISPLAY FORMAT |
|---|---|---|
| 56 | 1/4 SEC | 1/4 |
| 57 | 1/4 SEC AND 1/8 STOP | 1/4  1/8 |
| ... | ... | ... |
| 60 | 1/6 SEC (1/4 SEC AND 4/8 STOP (= 1/2 STOP)) | 1/4  4/8 |
| ... | ... | ... |
| 64 | 1/8 SEC | 1/8 |
| 65 | 1/8 SEC AND 1/8 STOP | 1/8  1/8 |
| ... | ... | ... |
| 68 | 1/10 SEC (1/8 SEC AND 4/8 STOP (= 1/2 STOP)) | 1/8  4/8 |
| ... | ... | ... |
| 72 | 1/15 SEC | 1/15 |
| 73 | 1/15 SEC AND 1/8 STOP | 1/15  1/8 |
| ... | ... | ... |
| 76 | 1/20 SEC (1/15 SEC AND 4/8 STOP (= 1/2 STOP)) | 1/15  4/8 |
| ... | ... | ... |
| 80 | 1/30 SEC | 1/30 |
| 81 | 1/30 SEC AND 1/8 STOP | 1/30  1/8 |
| ... | ... | ... |
| 84 | 1/45 SEC (1/30 SEC AND 4/8 STOP (= 1/2 STOP)) | 1/30  4/8 |
| ... | ... | ... |
| 88 | 1/60 SEC | 1/60 |
| 89 | 1/60 SEC AND 1/8 STOP | 1/60  1/8 |
| ... | ... | ... |
| 92 | 1/90 SEC (1/60 SEC AND 4/8 STOP (= 1/2 STOP)) | 1/60  4/8 |
| ... | ... | ... |
| 96 | 1/125 SEC | 1/125 |
| 97 | 1/125 SEC AND 1/8 STOP | 1/125  1/8 |
| ... | ... | ... |
| 100 | 1/180 SEC (1/125 SEC AND 4/8 STOP (= 1/2 STOP)) | 1/125  4/8 |
| ... | ... | ... |
| 104 | 1/250 SEC | 1/250 |
| 105 | 1/250 SEC AND 1/8 STOP | 1/250  1/8 |
| ... | ... | ... |
| 108 | 1/350 SEC (1/250 SEC AND 4/8 STOP (= 1/2 STOP)) | 1/250  4/8 |
| ... | ... | ... |

FIG. 9

| No | F-NUMBER (1/2-STOP INCREMENTS) | DISPLAY FORMAT |
|---|---|---|
| 0(N Min) | F1.0 | 1.0 |
| 1 | F1.2 (F1.0 AND 1/2 STOP) | 1.2 |
| 2 | F1.4 | 1.4 |
| 3 | F1.8 (F1.4 AND 1/2 STOP) | 1.8 |
| 4 | F2.0 | 2.0 |
| 5 | F2.5 (F2.0 AND 1/2 STOP) | 2.5 |
| 6 | F2.8 | 2.8 |
| 7 | F3.5 (F2.8 AND 1/2 STOP) | 3.5 |
| 8 | F4.0 | 4.0 |
| 9 | F4.5 (F4.0 AND 1/2 STOP) | 4.5 |
| 10 | F5.6 | 5.6 |
| 11 | F6.7 (F5.6 AND 1/2 STOP) | 6.7 |
| 12 | F8.0 | 8.0 |
| 13 | F9.5 (F8.0 AND 1/2 STOP) | 9.5 |
| 14 | F11 | 11 |
| 15 | F13 (F11 AND 1/2 STOP) | 13 |
| 16 | F16 | 16 |
| 17 | F19 (F16 AND 1/2 STOP) | 19 |
| ... | ... | ... |

FIG. 10

| No | F-NUMBER (1/3-STOP INCREMENTS) | DISPLAY FORMAT |
|---|---|---|
| 0(N Min) | F1.0 | 1.0 |
| 1 | F1.1 | 1.1 |
| 2 | F1.2 | 1.2 |
| 3 | F1.4 | 1.4 |
| 4 | F1.6 | 1.6 |
| 5 | F1.8 | 1.8 |
| 6 | F2.0 | 2.0 |
| 7 | F2.2 | 2.2 |
| 8 | F2.5 | 2.5 |
| 9 | F2.8 | 2.8 |
| 10 | F3.2 | 3.2 |
| 11 | F3.5 | 3.5 |
| 12 | F4.0 | 4.0 |
| 13 | F4.5 | 4.5 |
| 14 | F5.0 | 5.0 |
| 15 | F5.6 | 5.6 |
| 16 | F6.3 | 6.3 |
| 17 | F7.1 | 7.1 |
| 18 | F8.0 | 8.0 |
| 19 | F9.0 | 9.0 |
| 20 | F10 | 10 |
| 21 | F11 | 11 |
| 22 | F13 | 13 |
| 23 | F14 | 14 |
| 24 | F16 | 16 |
| 25 | F18 | 18 |
| 26 | F20 | 20 |
| ... | ... | ... |

FIG. 11

| No | F-NUMBER (1-STOP INCREMENTS) | DISPLAY FORMAT |
|---|---|---|
| 0(N Min) | F1.0 | 1.0 |
| 1 | F1.4 | 1.4 |
| 2 | F2.0 | 2.0 |
| 3 | F2.8 | 2.8 |
| 4 | F4.0 | 4.0 |
| 5 | F5.6 | 5.6 |
| 6 | F8.0 | 8.0 |
| 7 | F11 | 11 |
| 8 | F16 | 16 |
| ... | ... | ... |

FIG. 12

| No | ISO VALUE (1-STOP INCREMENTS) | DISPLAY FORMAT |
|---|---|---|
| 0(N Min) | ISO50 | 50 |
| 1 | ISO100 | 100 |
| 2 | ISO200 | 200 |
| 3 | ISO400 | 400 |
| 4 | ISO800 | 800 |
| 5 | ISO1600 | 1600 |
| 6 | ISO3200 | 3200 |
| 7 | ISO6400 | 6400 |
| ... | ... | ... |

FIG. 13

| No | ISO VALUE (1/3-STOP INCREMENTS) | DISPLAY FORMAT |
|---|---|---|
| 0(N Min) | ISO50 | 50 |
| 1 | ISO100 | 100 |
| 2 | ISO125 | 125 |
| 3 | ISO160 | 160 |
| 4 | ISO200 | 200 |
| 5 | ISO250 | 250 |
| 6 | ISO320 | 320 |
| 7 | ISO400 | 400 |
| 8 | ISO500 | 500 |
| 9 | ISO640 | 640 |
| 10 | ISO800 | 800 |
| 11 | ISO1000 | 1000 |
| 12 | ISO1250 | 1250 |
| 13 | ISO1600 | 1600 |
| 14 | ISO2000 | 2000 |
| 15 | ISO2500 | 2500 |
| 16 | ISO3200 | 3200 |
| 17 | ISO4000 | 4000 |
| 18 | ISO5000 | 5000 |
| 19 | ISO6000 | 6400 |
| ... | ... | ... |

FIG. 14

| No | SHUTTER SPEED (1/2-STOP INCREMENTS) | DISPLAY FORMAT |
|---|---|---|
| 0(N Min) | 30 SEC | 30" |
| 1 | 20 SEC (15 SEC AND 1/2 STOP) | 20" |
| 2 | 15 SEC | 15" |
| 3 | 10 SEC | 10" |
| 4 | 6 SEC | 6" |
| 5 | 4 SEC | 4" |
| 6 | 3 SEC | 3" |
| 7 | 2 SEC | 2" |
| 8 | 1.5 SEC | 1"5 |
| 9 | 1 SEC | 1" |
| 10 | 0.7 SEC | 0"7 |
| 11 | 0.5 SEC | 0"5 |
| 12 | 0.3 SEC | 0"3 |
| 13 | 1/4 SEC | 1/4 |
| 14 | 1/6 SEC | 1/6 |
| 15 | 1/8 SEC | 1/8 |
| 16 | 1/10 SEC | 1/10 |
| 17 | 1/15 SEC | 1/15 |
| 18 | 1/20 SEC | 1/20 |
| 19 | 1/30 SEC | 1/30 |
| 20 | 1/45 SEC | 1/45 |
| 21 | 1/60 SEC | 1/60 |
| 22 | 1/90 SEC | 1/90 |
| 23 | 1/125 SEC | 1/125 |
| 24 | 1/180 SEC | 1/180 |
| 25 | 1/250 SEC | 1/250 |
| 26 | 1/350 SEC | 1/350 |
| 27 | 1/500 SEC | 1/500 |
| ... | ... | ... |

FIG. 15A

| No | SHUTTER SPEED (1/3-STOP INCREMENTS) | DISPLAY FORMAT |
|---|---|---|
| 0(N Min) | 30 SEC | 30" |
| 1 | 25 SEC | 25" |
| 2 | 20 SEC | 20" |
| 3 | 15 SEC | 15" |
| 4 | 13 SEC | 13" |
| 5 | 10 SEC | 10" |
| 6 | 8 SEC | 8" |
| 7 | 6 SEC | 6" |
| 8 | 5 SEC | 5" |
| 9 | 4 SEC | 4" |
| 10 | 3.2 SEC | 3"2 |
| 11 | 2.5 SEC | 2"5 |
| 12 | 2 SEC | 2" |
| 13 | 1.6 SEC | 1"6 |
| 14 | 1.3 SEC | 1"3 |
| 15 | 1 SEC | 1 |
| 16 | 0.8 SEC | 0"8 |
| 17 | 0.6 SEC | 0"6 |
| 18 | 0.5 SEC | 0"5 |
| 19 | 0.4 SEC | 0"4 |
| 20 | 0.3 SEC | 0"3 |
| 21 | 1/4 SEC | 1/4 |
| 22 | 1/5 SEC | 1/5 |
| 23 | 1/6 SEC | 1/6 |
| 24 | 1/8 SEC | 1/8 |

FIG. 15B

| No | SHUTTER SPEED (1/3-STOP INCREMENTS) | DISPLAY FORMAT |
|---|---|---|
| 25 | 1/10 SEC | 1/10 |
| 26 | 1/13 SEC | 1/13 |
| 27 | 1/15 SEC | 1/15 |
| 28 | 1/20 SEC | 1/20 |
| 29 | 1/25 SEC | 1/25 |
| 30 | 1/30 SEC | 1/30 |
| 31 | 1/40 SEC | 1/40 |
| 32 | 1/50 SEC | 1/50 |
| 33 | 1/60 SEC | 1/60 |
| 34 | 1/80 SEC | 1/80 |
| 35 | 1/100 SEC | 1/100 |
| 36 | 1/125 SEC | 1/125 |
| 37 | 1/160 SEC | 1/160 |
| 38 | 1/200 SEC | 1/200 |
| 39 | 1/250 SEC | 1/250 |
| 40 | 1/320 SEC | 1/320 |
| 41 | 1/400 SEC | 1/400 |
| 42 | 1/500 SEC | 1/500 |
| 43 | 1/640 SEC | 1/640 |
| ... | ... | ... |

FIG. 16

| No | SHUTTER SPEED (1-STOP INCREMENTS) | DISPLAY FORMAT |
|---|---|---|
| 0(N Min) | 30 SEC | 30" |
| 1 | 15 SEC | 15" |
| 2 | 8 SEC | 8" |
| 3 | 4 SEC | 4" |
| 4 | 2 SEC | 2" |
| 5 | 1 SEC | 1" |
| 6 | 0.5 SEC | 0"5 |
| 7 | 1/4 SEC | 1/4 |
| 8 | 1/8 SEC | 1/8 |
| 9 | 1/15 SEC | 1/15 |
| 10 | 1/30 SEC | 1/30 |
| 11 | 1/60 SEC | 1/60 |
| 12 | 1/125 SEC | 1/125 |
| 13 | 1/250 SEC | 1/250 |
| ... | ... | ... |

FIG. 19
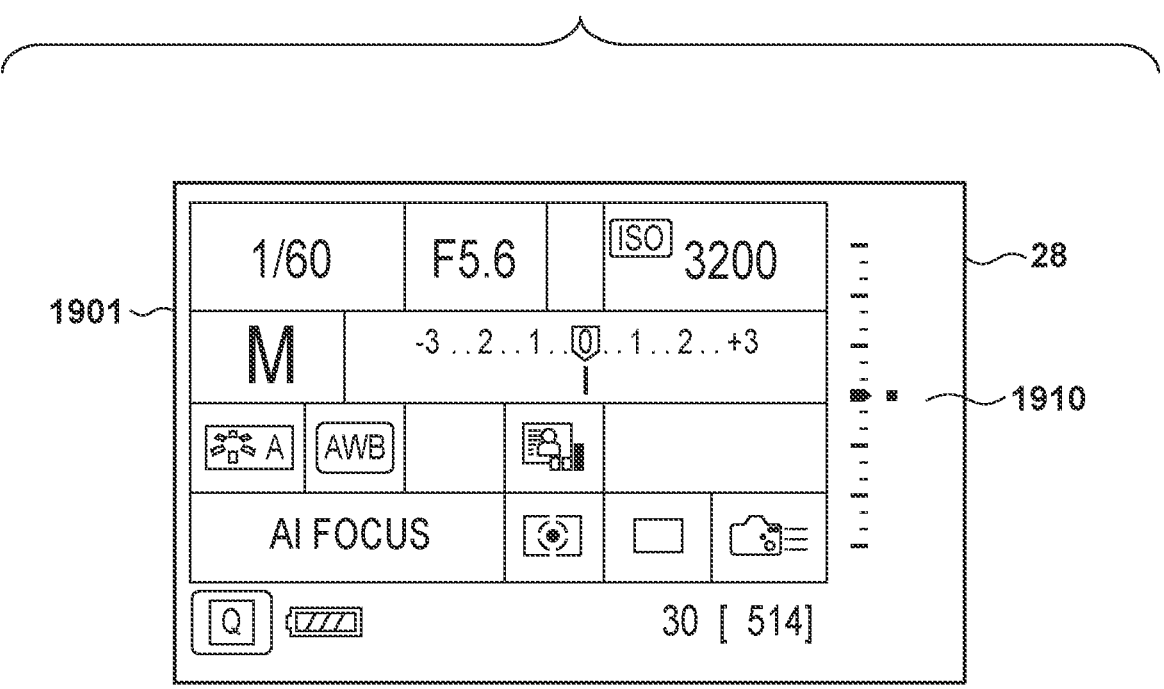
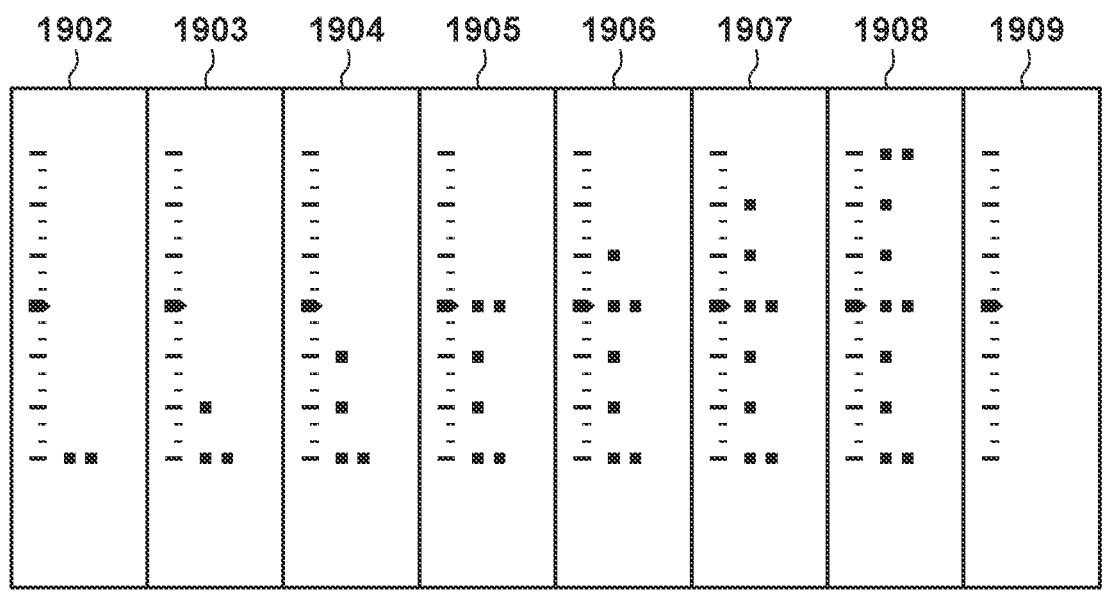

ELECTRONIC DEVICE, CONTROL METHOD THEREOF, AND STORAGE MEDIUM FOR SETTING EXPOSURE CONTROL PARAMETER

BACKGROUND OF THE INVENTION

Field of the Invention

The present invention relates to an electronic device, a control method thereof, and a storage medium.

Description of the Related Art

Electronic devices that can capture still images and moving images have become common in recent years. In interchangeable lens-type digital cameras, where the image sensor is relatively large, a user can control the depth of field when shooting by configuring the aperture setting value. To that end, there are operation modes such as aperture priority mode and manual mode (a mode where the user can set the shutter speed and ISO value in addition to the aperture setting value). These modes can be used for both still images and moving images.

Japanese Patent Laid-Open No. H8-166631 discloses a technique for displaying the aperture setting value set by a user. According to Japanese Patent Laid-Open No. H8-166631, the aperture setting value is displayed using a shot image number counter.

Settings for exposure control parameters such as the aperture setting value are typically made in ½ stop or ⅓-stop increments. However, there are also cases where one needs to make settings in smaller increments (units), such as ⅛-stop increments. "Stop" refers to a unit where the exposure (exposure amount) doubles or halves each time the stop increases by one. In other words, the aperture is said to have decreased by one stop (with the F-number increasing by one stop) when the area of the aperture opening halves. If the ISO sensitivity and the shutter speed are the same at this time, the exposure is said to have decreased by one stop. When the shutter speed is doubled (the exposure time is halved), the shutter speed is said to have become faster by one stop (the exposure time has become shorter by one stop). If the ISO sensitivity and the aperture setting value are the same at this time, the exposure is said to have decreased by one stop.

When displaying exposure control parameters set in smaller increments, if the number of significant figures is too low, there are situations where the exposure control parameters cannot be expressed appropriately. For example, if there are two significant figures for the aperture setting value, a state where the value has been reduced ⅛ stop from F1.0 will ultimately be expressed as F1.0, because even if the second and subsequent decimal places are rounded off, the change in the numerical value will not be enough to change the first decimal place. It is thus impossible to distinguish between F1.0 and ⅛ stop below F1.0 from the F-number that is displayed.

Even if the number of significant figures is sufficient, there is a problem in that it is difficult to intuitively understand the setting value. For example, if there are three significant figures, a state reduced by ⅛ stop from F1.00 will be displayed as F1.04, and thus the two values can be distinguished from each other. However, users are not typically accustomed to seeing setting values such as F1.04, and it is thus difficult for users to intuitively understand how much lower F1.04 is than F1.00.

SUMMARY OF THE INVENTION

Having been achieved in light of such circumstances, the present invention provides a technique for displaying setting values for exposure control parameters set in 1/n-stop increments in a format that a user can understand intuitively. Here, although n is typically an integer of 8 or more, the present invention is also applicable in situations where n is an integer of from 2 to 7.

According to a first aspect of the present invention, there is provided an electronic device comprising a memory and at least one processor and/or at least one circuit to perform the operations of the following units: a setting unit configured to be able to set a setting value for at least one exposure control parameter among aperture, shutter speed, and ISO sensitivity in 1/n-stop increments (where n is an integer greater than or equal to 8); and a display control unit configured to carry out control so that the setting value for the exposure control parameter set in 1/n-stop increments is displayed as a numerical value in one-stop increments and a fraction serving as a stop expression indicative of a stop that is less than one stop.

According to a second aspect of the present invention, there is provided a control method of an electronic device, comprising: setting a selling value for at least one exposure control parameter among aperture, shutter speed, and ISO sensitivity in 1/n-stop increments (where n is an integer greater than or equal to 8); and carrying out control so that the setting value for the exposure control parameter set in 1/n-stop increments is displayed as a numerical value in one-stop increments and a fraction serving as a stop expression indicative of a stop that is less than one stop.

According to a third aspect of the present invention, there is provided a non-transitory computer-readable storage medium which stores a program for causing a computer to execute a control method comprising: setting a setting value for at least one exposure control parameter among aperture, shutter speed, and ISO sensitivity in 1/n-stop increments (where n is an integer greater than or equal to 8); and carrying out control so that the setting value for the exposure control parameter set in 1/n-stop increments is displayed as a numerical value in one-stop increments and a fraction serving as a stop expression indicative of a stop that is less than one stop.

According to a fourth aspect of the present invention, there is provided an electronic device comprising a memory and at least one processor and/or at least one circuit to perform the operations of the following units: a setting unit configured to be able to set a setting value for at least one exposure control parameter among aperture, shutter speed, and ISO sensitivity in 1/n-stop increments (where n is an integer greater than or equal to 8); and a display control unit configured to carry out control so that the setting value for the exposure control parameter set in 1/n-stop increments is displayed as a numerical value in one-stop increments and a stop expression indicative of a stop that is less than one stop, wherein in a case where the stop less than one stop is m/n (where m is an integer greater than or equal to 1 and less than n), the display control unit carries out control so that m indicators are displayed as the stop expression.

According to a fifth aspect of the present invention, there is provided a control method of an electronic device, comprising: setting a setting value for at least one exposure control parameter among aperture, shutter speed, and ISO sensitivity in 1/n-stop increments (where n is an integer greater than or equal to 8); and carrying out control so that the setting value for the exposure control parameter set in 1/n-stop increments is displayed as a numerical value in one-stop increments and a stop expression indicative of a stop that is less than one stop, wherein in a case where the stop less than one stop is m/n (where m is an integer greater than or equal to 1 and less than n), m indicators are displayed as the stop expression.

According to a sixth aspect of the present invention, there is provided a non-transitory computer-readable storage medium which stores a program for causing a computer to execute a control method comprising: setting a setting value for at least one exposure control parameter among aperture, shutter speed, and ISO sensitivity in 1/n-stop increments (where n is an integer greater than or equal to 8); and carrying out control so that the setting value for the exposure control parameter set in 1/n-stop increments is displayed as a numerical value in one-stop increments and a stop expression indicative of a stop that is less than one stop, wherein in a case where the stop less than one stop is m/n (where m is an integer greater than or equal to 1 and less than n), m indicators are displayed as the stop expression.

Further features of the present invention will become apparent from the following description of exemplary embodiments with reference to the attached drawings.

BRIEF DESCRIPTION OF THE DRAWINGS

FIGS. 3A1 and 3A2 are flowcharts illustrating a shooting process.

FIGS. 3B1 and 3B2 are flowcharts illustrating the shooting process (continuing from FIGS. 3A1 and 3A2).

FIG. 3C is a diagram illustrating an example of a settings menu for carrying out a stop setting switching operation.

FIG. 6 is a diagram illustrating an example of F-numbers that can be set in the digital camera 100 in step S306, and a display format in step S307.

FIG. 7 is a diagram illustrating an example of ISO values that can be set in the digital camera 100 in step S318, and a display format in step S319.

FIG. 8A is a diagram illustrating an example of shutter speeds that can be set in the digital camera 100 in step S327, and a display format in step S328.

FIG. 8B is a diagram illustrating an example of shutter speeds that can be set in the digital camera 100 in step S327, and a display format in step S328.

FIG. 9 is a diagram illustrating an example of F-numbers that can be set in the digital camera 100 in step S309 of FIG. 3A1, and a display format in step S310 of FIG. 3A1.

FIG. 10 is a diagram illustrating an example of F-numbers that can be set in the digital camera 100 in step S312 of FIG. 3A1, and a display format in step S313 of FIG. 3A1.

FIG. 11 is a diagram illustrating an example of F-numbers that can be set in the digital camera 100 in step S314 of FIG. 3A1, and a display format in step S315 of FIG. 3A1.

FIG. 12 is a diagram illustrating an example of ISO values that can be set in the digital camera 100 in step S321 of FIG. 3A2, and a display format in step S322 of FIG. 3A2.

FIG. 13 is a diagram illustrating an example of ISO values that can be set in the digital camera 100 in step S323 of FIG. 3A2, and a display format in step S324 of FIG. 3A2.

FIG. 14 is a diagram illustrating an example of shutter speeds that can be set in the digital camera 100 in step S330 of FIG. 3B1, and a display format in step S331 of FIG. 3B1.

FIG. 15A is a diagram illustrating an example of shutter speeds that can be set in the digital camera 100 in step S333 of FIG. 3B1, and a display format in step S334 of FIG. 3B1.

FIG. 15B is a diagram illustrating an example of shutter speeds that can be set in the digital camera 100 in step S333 of FIG. 3B1, and a display format in step S334 of FIG. 3B1.

FIG. 16 is a diagram illustrating an example of shutter speeds that can be set in the digital camera 100 in step S335 of FIG. 3B1, and a display format in step S336 of FIG. 3B1.

FIG. 19 is a diagram illustrating a display format of exposure control parameters displayed in a display unit 28 in step S307 of FIG. 3A1.

DESCRIPTION OF THE EMBODIMENTS

Figure 1A:
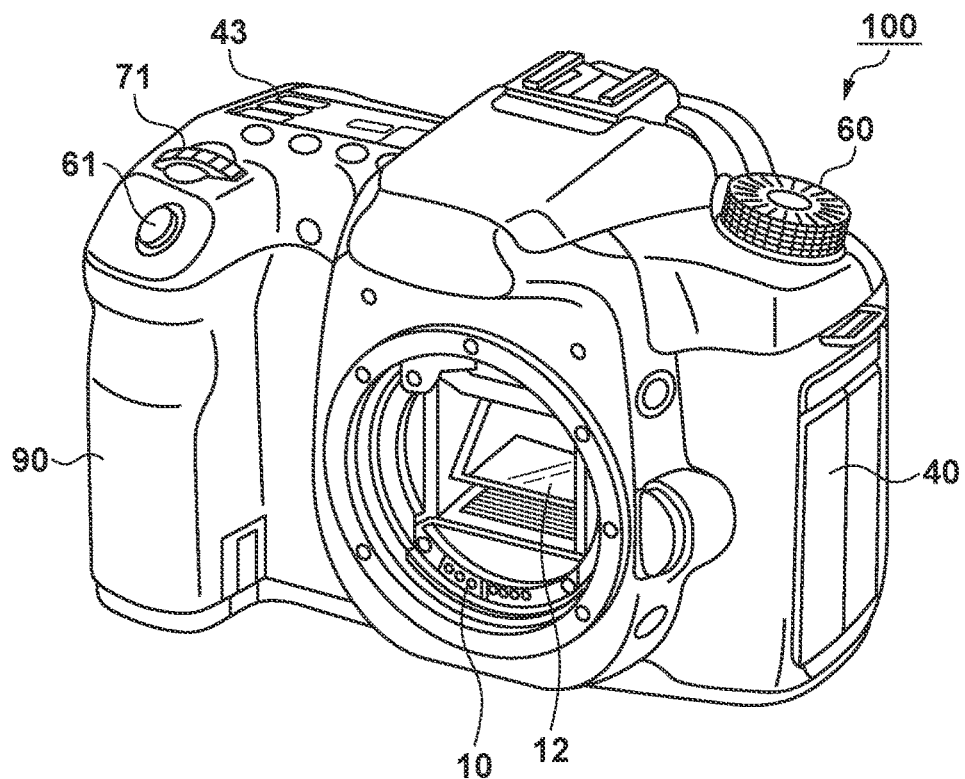
FIG. 1A is a front perspective view of a digital camera 100.

Hereinafter, embodiments of the present invention will be described with reference to the attached drawings. Elements that are given the same reference numerals throughout all of the attached drawings represent the same or similar elements. Note that the technical scope of the present invention is defined by the claims, and is not limited by the following respective embodiments. Also, not all of the combinations of the aspects that are described in the embodiments are necessarily essential to the present invention. Also, the aspects that are described in the individual embodiments can be combined as appropriate.

Figure 1B:
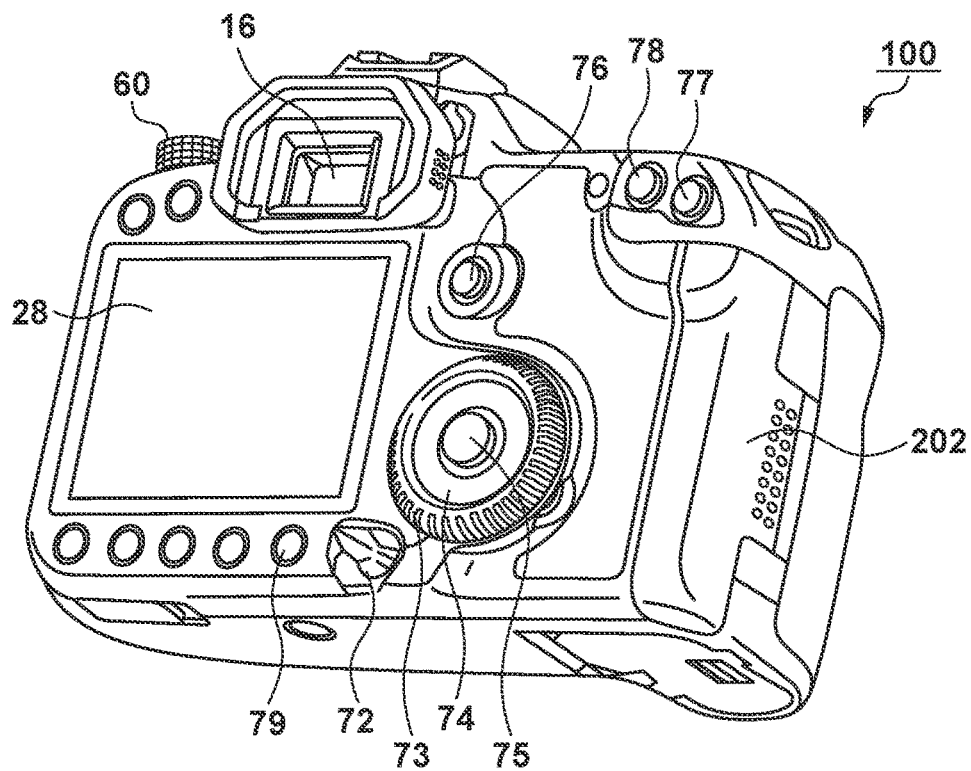
FIG. 1B is a rear perspective view of the digital camera 100.

FIGS. 1A and 1B are external views of a digital camera 100 serving as an example of an apparatus to which the present invention can be applied (an electronic device, an exposure setting apparatus, an image capturing apparatus, an image capture control apparatus). FIG. 1A is a front perspective view of the digital camera 100, and FIG. 1B is a rear perspective view of the digital camera 100. In FIGS. 1A and 1B, a display unit 28 is a display unit, provided in a rear surface of the camera, that displays images, various types of information, and the like. An outside-viewfinder display unit 43 is a display unit provided in a top surface of the camera, and displays various setting values of the camera, including shutter speed and aperture. A shutter button 61 is an operation unit for making a shooting instruction. A mode change switch 60 is an operation unit for switching among various types of modes. A terminal cover 40 is a cover for protecting a connector (not shown) for connecting a connection cable or the like that connects the digital camera 100 to an external device. A main electronic dial 71 is a rotating operation member included in an operation unit 70 shown in FIG. 2B, and setting values such as the shutter speed and aperture can be changed or the like by rotating the main electronic dial 71. A power switch 72 is an operation member that switches the power of the digital camera 100 on and off. A sub electronic dial 73 is a rotating operation member included in the operation unit 70, and a selection frame can be moved, images can be cycled through, and so on by rotating the sub electronic dial 73. A directional key 74 is a directional key, included in the operation unit 70, having top, bottom, left, and right parts that can be pressed (a four-direction key). An operation based on the part of the directional key 74 that has been pressed can be made. A set button 75 is a pushbutton included in the operation unit 70, and is used mainly to confirm selected items, An IN button 76 is a button, included in the operation unit 70, that switches a live view ("LV" hereinafter) on and off. In a moving image shooting mode, the LV button 76 is used to instruct moving image shooting (recording) to start and stop. An enlarge button 77 is an operation button, included in the operation unit 70, for turning an enlarged mode on and off during a live view display in the shooting mode, and for changing the magnification during the enlarged mode. In a playback mode, the enlarge button 77 functions as an enlarging button for enlarging the displayed image and increasing the magnification. A reduce button 78 is a button, included in the operation unit 70, for reducing the magnification of a display image that has been enlarged, and reducing the displayed image. A playback button 79 is an operation button, included in the operation unit 70, that switches between the shooting mode and the playback mode. Pressing the playback button 79 during the shooting mode causes a transition to the playback mode, and the newest image among images recorded in a recording medium 200 (described later) can be displayed in the display unit 28. A quick-return mirror 12 is flipped up and down by an actuator (not shown) in response to an instruction from a system control unit 50 (described later). A communication terminal 10 is a communication terminal through which the digital camera 100 communicates with a (removable) lens. An ocular viewfinder 16 is a look-through type of viewfinder through which the user confirms the focus, composition, and the like of an optical image of a subject obtained through a lens unit 150 (described later), by observing a focusing screen 13 (described later). A cover 202 is a cover for a slot into which the recording medium 200 is inserted. A grip part 90 is a holding part having a shape that the user can easily grip with his/her right hand while holding the digital camera 100.

Figure 2A:
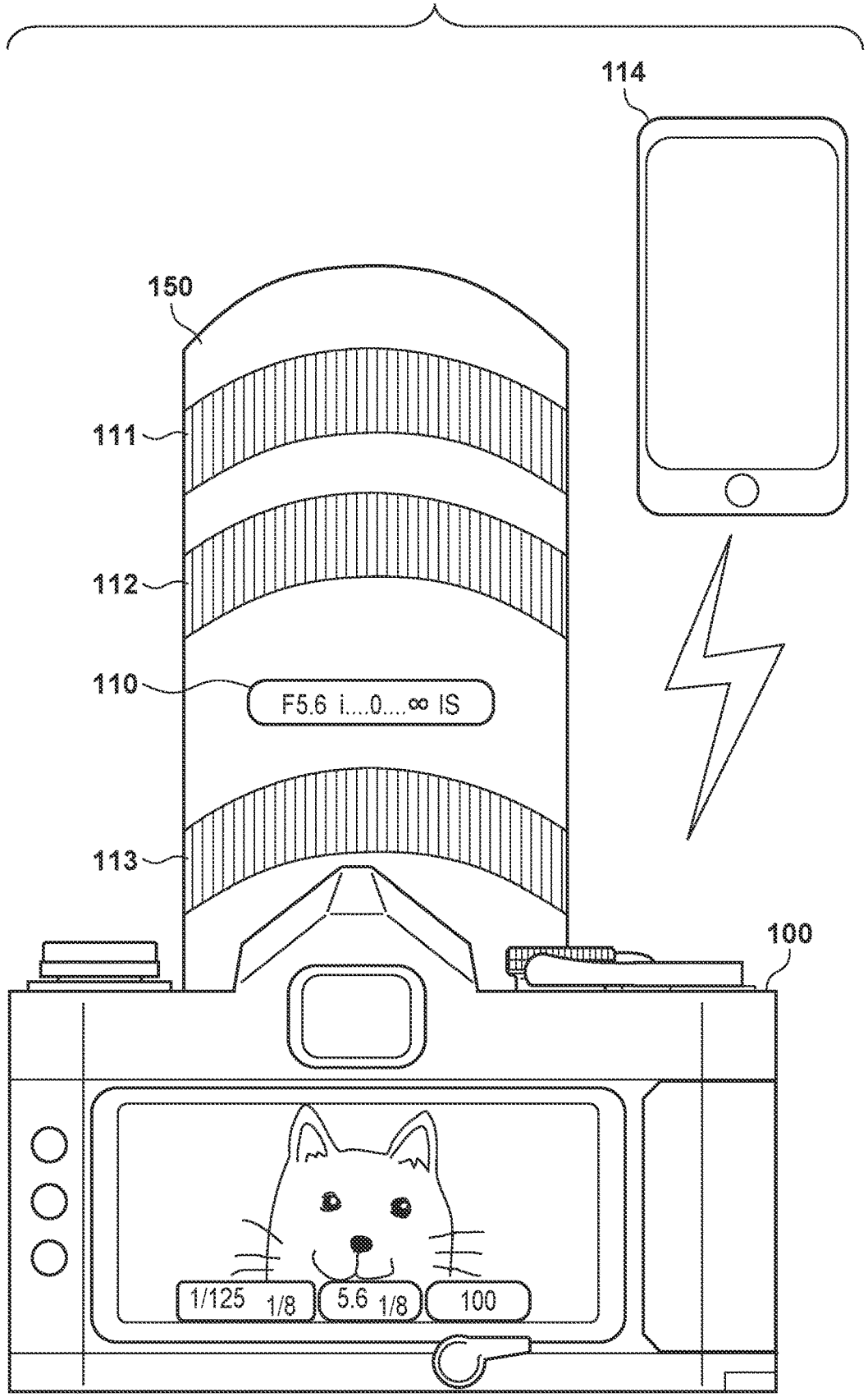
FIG. 2A is a diagram illustrating a state where a lens unit 150 is mounted to the digital camera 100.

FIG. 2A is a diagram illustrating a state where the lens unit 150 is mounted to the digital camera 100. Although the appearance of the digital camera 100 in FIG. 2A is different from the appearance of the digital camera 100 illustrated in FIGS. 1A and 1B, these appearances may be the same. In the present embodiment, the appearance of the digital camera 100 is not particularly limited, and any desired appearance can be employed.

The lens unit 150 includes a lens display unit 110, a first ring 111, a second ring 112, and a third ring 113. The lens display unit 110 can display aperture setting values, focal distances, image stabilization states, and the like, for example.

Functions such as manual focus operations, zoom operations, aperture setting operations, shutter speed setting operations, ISO value setting operations, and the like can be assigned to the first ring 111, the second ring 112, and the third ring 113. The following descriptions assume that a function for aperture setting operations has been assigned to the third ring 113.

The digital camera 100 can communicate with an external apparatus such as a smartphone 114 through a communication unit 54 (described later).

Figure 2B:
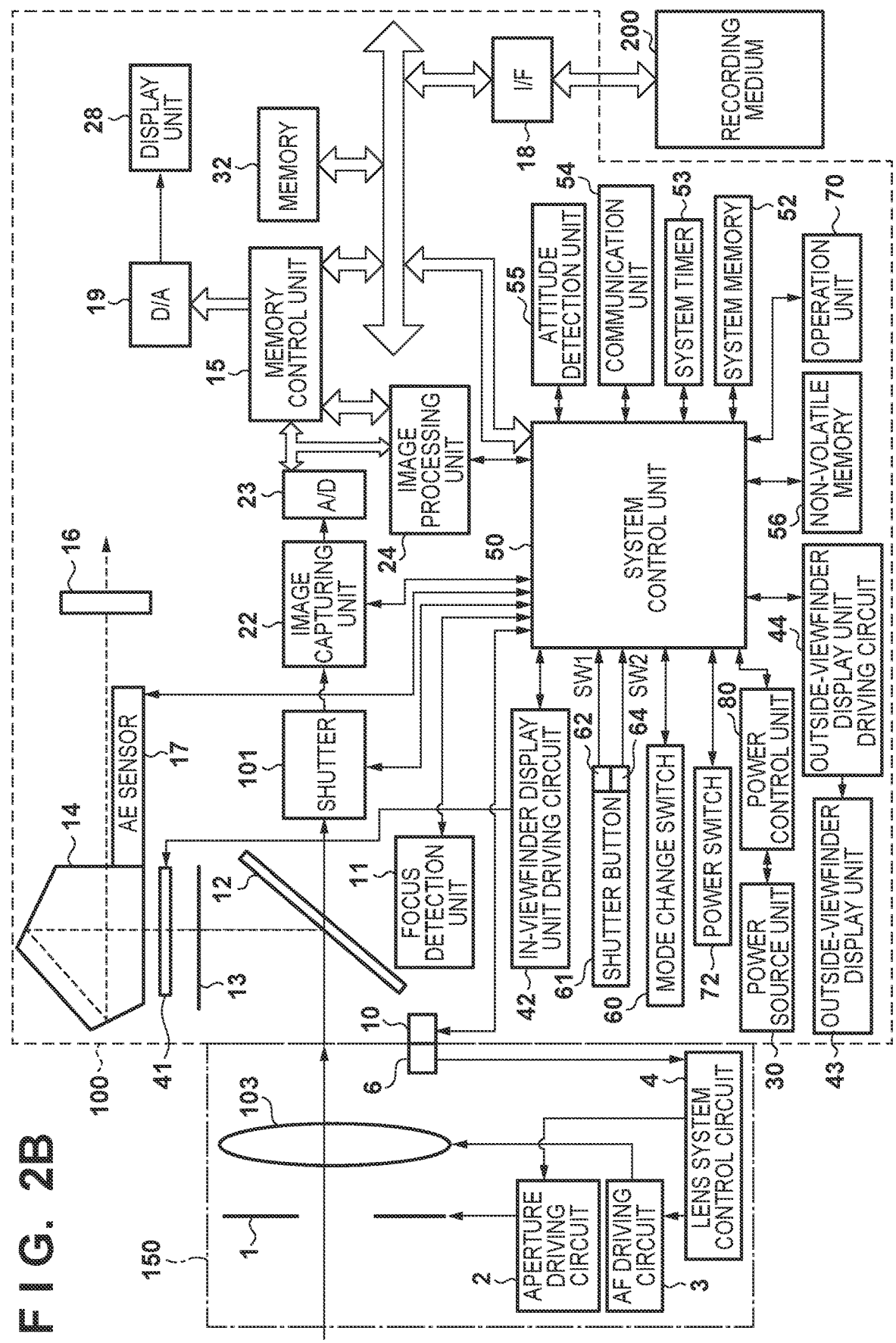
FIG. 2B is a block diagram illustrating an example of the configuration of the digital camera 100.

FIG. 2B is a block diagram illustrating an example of the configuration of the digital camera 100. In FIG. 2B, the lens unit 150 is an interchangeable lens unit including a shooting lens. A lens 103 is nominally constituted by a plurality of lenses, but only one lens is shown here for the sake of simplicity. A communication terminal 6 is a communication terminal through which the lens unit 150 communicates with the digital camera 100 side, and the communication terminal 10 is a communication terminal through which the digital camera 100 communicates with the lens unit 150 side. The lens unit 150 communicates with the system control unit 50 through the communication terminals 6 and 10. A lens system control circuit 4 controls an aperture 1 through an aperture driving circuit 2. The lens system control circuit 4 also adjusts the focus by changing the position of the lens 103 using an AF driving circuit 3.

Upon detecting that the first ring 111, the second ring 112, and the third ring 113 illustrated in FIG. 2A have been operated, the lens system control circuit 4 communicates information indicating the details of the operation to the system control unit 50 through the communication terminals 6 and 10.

An AE sensor 17 measures the brightness of a subject through the lens unit 150. A focus detection unit 11 outputs defocus amount information to the system control unit 50. The system control unit 50 carries out phase difference AF by controlling the lens unit 150 on the basis of the defocus amount information.

The quick-return mirror 12 is flipped up and down by an actuator (not shown) in response to instructions from the system control unit 50 during exposure, live view shooting, and moving image shooting. The quick-return mirror 12 is a mirror for switching the destination of light beams entering through the lens 103 between the ocular viewfinder 16 side and an image capturing unit 22 side. Although the quick-return mirror 12 is normally positioned so as to reflect the light beams toward the ocular viewfinder 16, the quick-return mirror 12 is raised upward and retracted from the optical path so that the light beams are guided to the image capturing unit 22 (mirror up) during shooting, live view display, and the like. Additionally, the quick-return mirror 12 is a half mirror so that some light can pass through a central part thereof, and thus some of the light beams are transmitted so as to enter the focus detection unit 11 for the purpose of focus detection.

By observing the focusing screen 13 through a pentaprism 14 and the ocular viewfinder 16, the user can confirm the focus, composition, and so on of the optical image of a subject obtained through the lens unit 150.

A shutter 101 is a focal plane shutter through which the exposure time of the image capturing unit 22 can be freely controlled wider the control of the system control unit 50. The image capturing unit 22 is an image sensor constituted by a CCD, a CMOS element, or the like that converts an optical image into an electrical signal. An A/D converter 23 converts analog signals into digital signals. The A/D converter 23 is used to convert analog signals output from the image capturing unit 22 into digital signals.

An image processing unit 24 carries out prescribed pixel interpolation, resizing processing such as reduction, color conversion processing, and the like on data from the A/D converter 23 or data from a memory control unit 15. The image processing unit 24 also performs predetermined computational processing using captured image data. The system control unit 50 performs exposure control and rangefinding control based on the computational results obtained by the image processing unit 24. A TTL (through-the-lens) AF (autofocus) process, an AE (automatic exposure) process, and an EF (flash pre-emission) process are realized as a result. The image processing unit 24 also performs predetermined computational processing using the captured image data, performing a TTL AWB (auto white balance) process on the basis of the obtained computational results.

Data output from the A/D converter 23 is written into memory 32 through the image processing unit 24 and the memory control unit 15, or directly through the memory control unit 15. The memory 32 stores the image data obtained by the image capturing unit 22 and converted into digital data by the A/D converter 23, image data for display in the display unit 28, and the like.

The memory 32 is provided with a storage capacity sufficient to store a predetermined number of still images, a predetermined time's worth of moving images and audio, and so on. The memory 32 also functions as image display memory (video memory). A D/A converter 19 converts data for image display, stored in the memory 32, into an analog signal and supplies the analog signal to the display unit 28. Image data for display written into the memory 32 thus displayed by the display unit 28 via the D/A converter 19 in this manner. The display unit 28 carries out a display in the display device, which is an LCD or the like, based on the analog signal from the D/A converter 19. By using the D/A converter 19 to convert the digital signals A/D converted by the A/D converter 23 and stored in the memory 32 into analog signals and then sequentially transferring and displaying those signals in the display unit 28, the display unit 28 functions as an electronic viewfinder. Accordingly, the display unit 28 can display a through-the-lens image (live view display (LV display)). The image displayed in the live view will be called an "LV image" hereinafter.

A frame indicating a rangefinding point where autofocus is currently being carried out (an AF frame), icons expressing the state of settings in the camera, and so on are displayed in an in-viewfinder display unit 41 through an in-viewfinder display unit driving circuit 42.

Various setting values of the camera, including shutter speed and aperture, are displayed in the outside-viewfinder display unit 43 through an outside-viewfinder display unit driving circuit 44.

Non-volatile memory 56 is electrically erasable/recordable memory, and, for example, EEPROM is used. Operational constants, programs, and so on of the system control unit 50 are stored in the non-volatile memory 56. Here, "programs" refers to programs for executing the various flowcharts according to the present embodiment, which will be described later.

The system control unit 50 is a control unit constituted by at least one processor or circuit, and controls the entire digital camera 100. The system control unit 50 implements the respective processes according to the present embodiment, described later, by executing programs recorded in the non-volatile memory 56 mentioned above. Operational constants and variables of the system control unit 50, programs read out from the non-volatile memory 56, and so on are loaded into the system memory 52, which uses RAM, for example. The system control unit 50 also carries out display control by controlling the memory 32, the D/A converter 19, the display unit 28, and so on.

A system timer 53 is a time measurement unit that measures times used in various types of control, measures the time of an internal and clock, and so on. A mode change switch 60, a first shutter switch 62, a second shutter switch 64, and the operation unit 70 are operation members for inputting various types of operation instructions to the system control unit 50. The mode change switch 60 switches the operating mode of the system control unit 50 among a still image recording mode, a moving image shooting mode, a playback mode, and so on. The still image recording mode includes an auto shooting mode, an auto scene determination mode, the manual mode, an aperture priority mode (Av mode), a shutter speed priority mode (Tv mode), a program AE mode, and so on. There are also various types of scene modes, custom modes, and the like as shooting settings for different shooting scenes. Using the mode change switch 60, the user can switch directly to any one of these modes. Alternatively, the user may display a shooting mode list screen in the display unit 28 using the mode change switch 60, select one of the plurality of modes that is displayed, and then confirm the selection using another operation member in order to switch the shooting mode. Likewise, the moving image shooting mode may include a plurality of modes.

The first shutter switch 62 switches on partway through the operation of the shutter button 61 provided in the digital camera 100, or in other words, when the button is depressed halfway (a shooting preparation instruction), and produces a first shutter switch signal SW1. The system control unit 50 starts operations such as AF (autofocus) processes, AE (automatic exposure) processes, AWB (auto white balance) processes, and EF (flash pre-emission) processes in response to the first shutter switch signal SW1.

The second shutter switch 64 turns on when the shutter button 61 is completely operated, or in other words, is fully depressed (a shooting instruction), and produces a second shutter switch signal SW2. The system control unit 50 starts a series of shooting processes, from reading out signals from the image capturing unit 22 to writing image data into the recording medium 200, in response to the second shutter switch signal SW2.

Functions relevant for different situations are assigned to operation members in the operation unit 70, which then act as various types of function buttons, by making an operation for selecting various types of function icons displayed in the display unit 28. An end button, a return button, a next image button, a jump button, a sort button, an attribute change button, and so on are examples of the function buttons. For example, a menu screen in which various types of settings can be made is displayed in the display unit 28 when a menu button is pressed. The user can make various types of settings intuitively using the menu screen displayed in the display unit 28, along with the up, down, left, and right directional buttons, the set button, and so on.

The operation unit 70 includes various types of operation members as input units for accepting operations from the user. The operation unit 70 includes pushbuttons, rotating dials, a touch sensor, and the like, and includes at least the following operation units. These units include the shutter button 61, the main electronic dial 71, the power switch 72, the sub electronic dial 73, the directional key 74, the set button 75, the LV button 76, the enlarge button 77, the reduce button 78, and the playback button 79.

A power control unit 80 is constituted by a battery detection circuit, a DC-DC converter, switch circuits for switching the blocks through which power passes, and so on, and detects whether or not a battery is connected, the type of the battery, the remaining battery power, and so on. The power control unit 80 also controls the DC-DC converter based on the detection results and instructions from the system control unit 50, and supplies a necessary voltage for a necessary period to the various units, including the recording medium 200. A power source unit 30 is a primary battery such as an alkaline battery, a lithium battery, or the like, a secondary battery such as a NiCd battery, a NiMH battery, a Li battery, or the like, an AC adapter, and so on.

A recording medium I/F 18 is an interface for the recording medium 200 such as a memory card, a hard disk, or the like. The recording medium 200 is a recording medium for recording shot images, such as a memory card or the like, and is constituted by semiconductor memory, a magnetic disk, or the like.

The communication unit 54 is connected to the external apparatus wirelessly or over a hardwire cable, and sends and receives video signals, audio signals, and the like. The communication unit 54 can also connect to a wireless LAN (local area network), the Internet, and so on. The communication unit 54 is also capable of communicating with the external device over Bluetooth (registered trademark), Bluetooth Low Energy, or the like. The communication unit 54 can transmit images captured by the image capturing unit 22 (including LV images), images recorded in the recording medium 200, and the like, and can also receive images and various other types of information from the external apparatus.

An attitude detection unit 55 detects the attitude of the digital camera 100 relative to the gravitational direction. Whether an image captured by the image capturing unit 22 is an image shot while the digital camera 100 was held horizontally or vertically can be determined on the basis of the attitude detected by the attitude detection unit 55. The system control unit 50 can add orientation information based on the attitude detected by the attitude detection unit 55 to the image file of an image captured by the image capturing unit 22, record the image in a rotated state, and so on. An accelerometer, a gyrosensor, or the like can be used as the attitude detection unit 55. It is also possible to detect movement of the digital camera 100 (pan, tilt, lifting, whether or not the camera is at rest, and the like) using the accelerometer, gyrosensor, or the like serving as the attitude detection unit 55.

The flow of the shooting process will be described next with reference to FIGS. 3A1 and 3A2, and FIGS. 3B1 and 3B2. Unless otherwise specified, the processes of the steps in the flowchart illustrated in FIGS. 3A1 and 3A2, and in FIGS. 3B1 and 3B2, are realized by the system control unit 50 loading programs stored in the non-volatile memory 56 into system memory 52 and executing the programs. The processing illustrated in these flowcharts is started when the operating mode of the digital camera 100 is set to a shooting mode (the still image recording mode (still image shooting mode) or the moving image shooting mode).

In step S301, the system control unit 50 determines whether or not an operation for switching a stop setting pertaining to the settings of exposure control parameters (the aperture setting value, the shutter speed, or the ISO value) (a stop setting switching operation) has been carried out. The user can carry out the stop setting switching operation using the operation unit 70. When the user uses the operation unit 70 to instruct the settings menu to be displayed, the system control unit 50 displays a settings menu such as that illustrated in FIG. 3C, for example. In the settings menu, the user can change the settings for an item selected by a cursor (in the example of FIG. 3C, "exposure setting increment" is selected by the cursor). The user can select one stop, ½ stop, or ⅓ stop as the exposure setting increment (in the example of FIG. 3C, ⅓ stop is selected). If an operation for changing the F-number or the shutter speed (described later) has been made, the setting value (the F-number or the shutter speed) is changed in units of the stop set as the exposure setting increment. The user can select one stop or ⅓ stop as an ISO sensitivity setting increment (in the example of FIG. 3C, ⅓ stop is selected). If an operation for changing the ISO value (described later) has been made, the setting value (the ISO value) is changed in units of the stop set as the ISO sensitivity setting increment. The user can also select "yes" or "no" for a ⅛ stop setting (in the example of FIG. 3C, "no" is selected). If "yes" is selected for the ⅛ stop, the setting values for the exposure control parameters (the aperture setting value, the shutter speed, and the ISO value) are changed in ⅛-stop units regardless of the settings for the exposure setting increment and the ISO sensitivity setting increment. The higher the stop setting is, the greater the exposure parameters are changed in response to the same operation amount. The lower the stop setting is, the more finely the exposure parameters can be adjusted in response to the same operation amount, which makes fine adjustments possible.

Although the options for the ISO sensitivity setting increment are only one stop and ⅓ stop in the example of FIG. 3C, the digital camera 100 may be configured so that ½ stop can also be selected as the ISO sensitivity setting increment.

The settings menu may include setting items such as "moving image AV value ⅛ stop setting", which is used only for the aperture setting value when shooting a moving image, instead of the "⅛ stop setting". Consider a case where "yes" is selected for the moving image Av value ⅛ stop setting and the operating mode of the digital camera 100 is the moving image shooting mode. In this case, the aperture setting value is changed in units of ⅛ stop regardless of the setting of the exposure setting increment. On the other hand, the setting values of the shutter speed and the ISO value are changed in units of the stop set as the exposure setting increment and the ISO sensitivity setting increment, respectively. If the operating mode of the digital camera 100 is the still image recording mode, the moving image Av value ⅛ stop setting does not affect the units in which the setting values of the exposure control parameters are changed. In other words, even if "yes" is selected, for the moving image Av value ⅛ stop setting, the F-number and the shutter speed are changed in units corresponding to the stop selected as the exposure setting increment, and the ISO value is changed in units corresponding to the stop set as the ISO sensitivity setting increment.

In both the still image recording mode and the moving image shooting mode, one or two of the aperture setting value, the shutter speed, and the ISO value may be able to be set in ⅛-stop increments. In this case, even if "yes" is selected for the ⅛ stop setting, setting values for exposure control parameters not subject to the ⅛ stop setting are changed in accordance with the exposure setting increment or the ISO sensitivity setting increment.

All of the aperture setting value, the shutter speed, and the ISO value may be able to be set in ⅛-stop increments in only one of the still image recording mode and the moving image shooting mode. In this case, even if "yes" is selected for the ⅛ stop setting, the setting values for the exposure control parameters are changed in accordance with the exposure setting increment and the ISO sensitivity setting increment if the operating mode of the digital camera 100 is an operating mode not subject to this setting.

In only one of the still image recording mode and the moving image shooting mode, one or two of the aperture setting value, the shutter speed, and the ISO value may be able to be set in ⅛-stop increments. In this case, even if "yes" is selected for the ⅛ stop setting, setting values for exposure control parameters for a combination of the operating mode and exposure control parameters not subject to the ⅛ stop setting are changed in accordance with the exposure setting increment or the ISO sensitivity setting increment.

When at least one of the exposure setting increment, the ISO sensitivity setting increment, and the ⅛ stop setting has been changed through the settings menu of FIG. 3C, the system control unit 50 determines that the stop setting switching operation has been carried out, and moves the process to step S302. When such is not the case, the process moves to step S304.

In step S302, the system control unit 50 switches the stop setting (the unit for setting the exposure control parameters; the set increments) by storing a setting value corresponding to the selection made through the settings menu in the non-volatile memory 56.

In step S303, the system control unit 50 displays the exposure control parameters in a display format based on the stop setting. The process of step S303 will be described in detail later.

In step S304, the system control unit 50 determines whether or not an operation for changing the F-number has been made. The system control unit 50 determines that an operation for changing the F-number has been made if, for example, rotation of the third ring 113, to which the function for aperture setting operations has been assigned, has been detected. If an operation for changing the F-number has been made, the process moves to step S305, whereas when such is not the case, the process moves to step S316.

In step S305, the system control unit 50 determines whether or not the stop setting for changing the F-number is ⅛-stop increments. If "yes" is selected as the ⅛ stop setting in the settings menu of FIG. 3C, the system control unit 50 determines that the stop setting for changing the F-number is ⅛-stop increments. If the stop setting for changing the F-number is ⅛-stop increments, the process moves to step S306, whereas when such is not the case, the process moves to step S308.

In step S306, the system control unit 50 increases or reduces the F-number in accordance with the operation direction and operation amount of the third ring 113, by ⅛ stop per single pulse (a signal output when the ring is rotated by the minimum detectable rotation amount). In other words, the minimum change amount is ⅛ stop. In step S307, the system control unit 50 updates the ⅛ stop display for the F-number. The display format used here will be described later.

In step S308, the system control unit 50 determines whether or not the stop setting for changing the F-number is ½-stop increments. If "no" is selected as the ⅛ stop setting and "½ stop" is selected as the exposure setting increment in the settings menu of FIG. 3C, the system control unit 50 determines that the stop setting for changing the F-number is ½-stop increments. If the stop setting for changing the F-number is ½-stop increments, the process moves to step S309, whereas when such is not the case, the process moves to step S311.

In step S309, the system control unit 50 increases or reduces the F-number in accordance with the operation direction and operation amount of the third ring 113, by ½ stop per single pulse. In other words, the minimum change amount is ½ stop. In step S310, the system control unit 50 updates the ½ stop display for the F-number. The display format used here will be described later.

In step S311, the system control unit 50 determines whether or not the stop setting for changing the F-number is ⅓-stop increments. If "no" is selected as the ⅛ stop setting and "⅓ stop" is selected as the exposure setting increment in the settings menu of FIG. 3C, the system control unit 50 determines that the stop setting for changing the F-number is ⅓-stop increments. If the stop setting for changing the F-number is ⅓ stop increments, the process moves to step S312, whereas when such is not the case, the process moves to step S314.

In step S312, the system control unit 50 increases or reduces the F-number in accordance with the operation direction and operation amount of the third ring 113, by ⅓ stop per single pulse. In other words, the minimum change amount is ⅓ stop. In step S313, the system control unit 50 updates the ⅓ stop display for the F-number. The display format used here will be described later.

In step S314, the system control unit 50 increases or reduces the F-number in accordance with the operation direction and operation amount of the third ring 113, by one stop per single pulse. In other words, the minimum change amount is one stop. In step S315, the system control unit 50 updates the one stop display for the F-number. The display format used here will be described later.

In step S316, the system control unit 50 determines whether or not an operation for changing the ISO value has been made. The system control unit 50 determines that an operation for changing the ISO value has been made upon detecting, for example, an operation for rotating the main electronic dial 71 while pressing the set button 75. If an operation for changing the ISO value has been made, the process moves to step S317, whereas when such is not the case, the process moves to step S325.

In step S317, the system control unit 50 determines whether or not the stop setting for changing the ISO value is ⅛-stop increments. If "yes" is selected as the ⅛ stop setting in the settings menu of FIG. 3C, the system control unit 50 determines that the stop setting for changing the ISO value is ⅛-stop increments. If the stop setting for changing the ISO value is ⅛-stop increments, the process moves to step S318, whereas when such is not the case, the process moves to step S320.

In step S318, the system control unit 50 increases or reduces the ISO value in accordance with the operation direction and operation amount of the main electronic dial 71, by ⅛ stop per single pulse. In step S319, the system control unit 50 updates the ⅛ stop display for the ISO value. The display format used here will be described later.

In step S320, the system control unit 50 determines whether or not the stop setting for changing the ISO value is one-stop increments. If "no" is selected as the ⅛ stop setting and "one stop" is selected as the ISO sensitivity setting increment in the settings menu of FIG. 3C, the system control unit 50 determines that the stop setting for changing the ISO value is one-stop increments. If the stop setting for changing the ISO value is one-stop increments, the process moves to step S321, whereas when such is not the case, the process moves to step S323.

In step S321, the system control unit 50 increases or reduces the ISO value in accordance with the operation direction and operation amount of the main electronic dial 71, by one stop per single pulse. In step S322, the system control unit 50 updates the one stop display for the ISO value. The display format used here will be described later.

In step S323, the system control unit 50 increases or reduces the ISO value in accordance with the operation direction and operation amount of the main electronic dial

71, by ⅓ stop per single pulse. In step S324, the system control unit 50 updates the ⅓ stop display for the ISO value. The display format used here will be described later.

In step S325, the system control unit 50 determines whether or not an operation for changing the shutter speed has been made. The system control unit 50 determines that an operation for changing the shutter speed has been made upon, for example, detecting an operation of rotating the main electronic dial 71. If an operation for changing the shutter speed has been made, the process moves to step S326, whereas when such is not the case, the process moves to step S337.

In step S326, the system control unit 50 determines whether or not the stop setting for changing the shutter speed is ⅛-stop increments. If "yes" is selected as the ⅛ stop setting in the settings menu of FIG. 3C, the system control unit 50 determines that the stop setting for changing the shutter speed is ⅛-stop increments. If the stop setting for changing the shutter speed is ⅛-stop increments, the process moves to step S327, whereas when such is not the case, the process moves to step S329.

In step S327, the system control unit 50 increases or reduces the shutter speed in accordance with the operation direction and operation amount of the main electronic dial 71, by ⅛ stop per single pulse. In step S328, the system control unit 50 updates the ⅛ stop display for the shutter speed. The display format used here will be described later.

In step S329, the system control unit 50 determines whether or not the stop setting for changing the shutter speed is ½-stop increments, if "no" is selected as the ⅛ stop setting and "½ stop" is selected as the exposure setting increment in the settings menu of FIG. 3C, the system control unit 50 determines that the stop setting for changing the shutter speed is ½-stop increments. If the stop setting for changing the shutter speed is ½-stop increments, the process moves to step S330, whereas when such is not the case, the process moves to step S332.

In step S330, the system control unit 50 increases or reduces the shutter speed in accordance with the operation direction and operation amount of the main electronic dial 71, by ½ stop per single pulse. In step S331, the system control unit 50 updates the ½ stop display for the shutter speed. The display format used here will be described later.

In step S332, the system control unit 50 determines whether or not the stop setting for changing the shutter speed is ⅓-stop increments. If "no" is selected as the ⅛ stop setting and "⅓ stop" is selected as the exposure setting increment in the settings menu of FIG. 3C, the system control unit 50 determines that the stop setting for changing the shutter speed is ⅓-stop increments. If the stop setting for changing the shutter speed is ⅓-stop increments, the process moves to step S333, whereas when such is not the case, the process moves to step S335.

In step S333, the system control unit 50 increases or reduces the shutter speed in accordance with the operation direction and operation amount of the main electronic dial 71, by ⅓ stop per single pulse. In step S334, the system control unit 50 updates the ⅓ stop display for the shutter speed. The display format used here will be described later.

In step S335, the system control unit 50 increases or reduces the shutter speed in accordance with the operation direction and operation amount of the main electronic dial 71, by one stop per single pulse. In step S336, the system control unit 50 updates the one stop display for the shutter speed. The display format used here will be described later.

In step S337, the system control unit 50 determines whether or not SW1 is on (whether or not the first shutter switch 62 is being pressed). If SW1 is on, the process moves to step S338, whereas when such is not the case, the process returns to step S301.

In step S338, the system control unit 50 carries out automatic focus adjustment control (AF) and automatic exposure control (AE) on the basis of the exposure control parameters (the aperture setting value, shutter speed, and ISO sensitivity) set in the above-described step S304 to step S336. Note that the AE is not carried out when the exposure setting mode is the manual mode. In step S339, the system control unit 50 determines whether or not SW2 is on (whether or not the second shutter switch 64 is being pressed). If SW2 is on, the process moves to step S340, whereas when such is not the case, the process moves to step S341.

In step S340, the system control unit 50 executes a shooting process for obtaining an image from the image capturing unit 22, The exposure control parameters used in the shooting are the exposure control parameters set as a result of the AF or AE carried out in step S338 or set in the above-described processing from step S304 to step S336. In other words, the system control unit 50 carries out a shooting process that applies the exposure control parameters set in the above-described processing from step S304 to step S336. If the operating mode of the digital camera 100 is the still image recording mode, the system control unit 50 shoots a still image. If the operating mode of the digital camera 100 is the moving image shooting mode, the system control unit 50 shoots a moving image. The shooting of the moving image continues until the second shutter switch 64 is pressed a second time. In the shooting process of step S340, the shot still image or moving image is recorded in the recording medium 200 as an image file. In other words, this shooting is actual shooting, which is different from the live view shooting carried out while standing by to shoot an image.

In step S341, the system control unit 50 determines whether or not SW1 is being kept on. If SW1 is being kept on, the process moves to step S338, whereas when such is not the case, the process returns to step S301.

Figure 4:
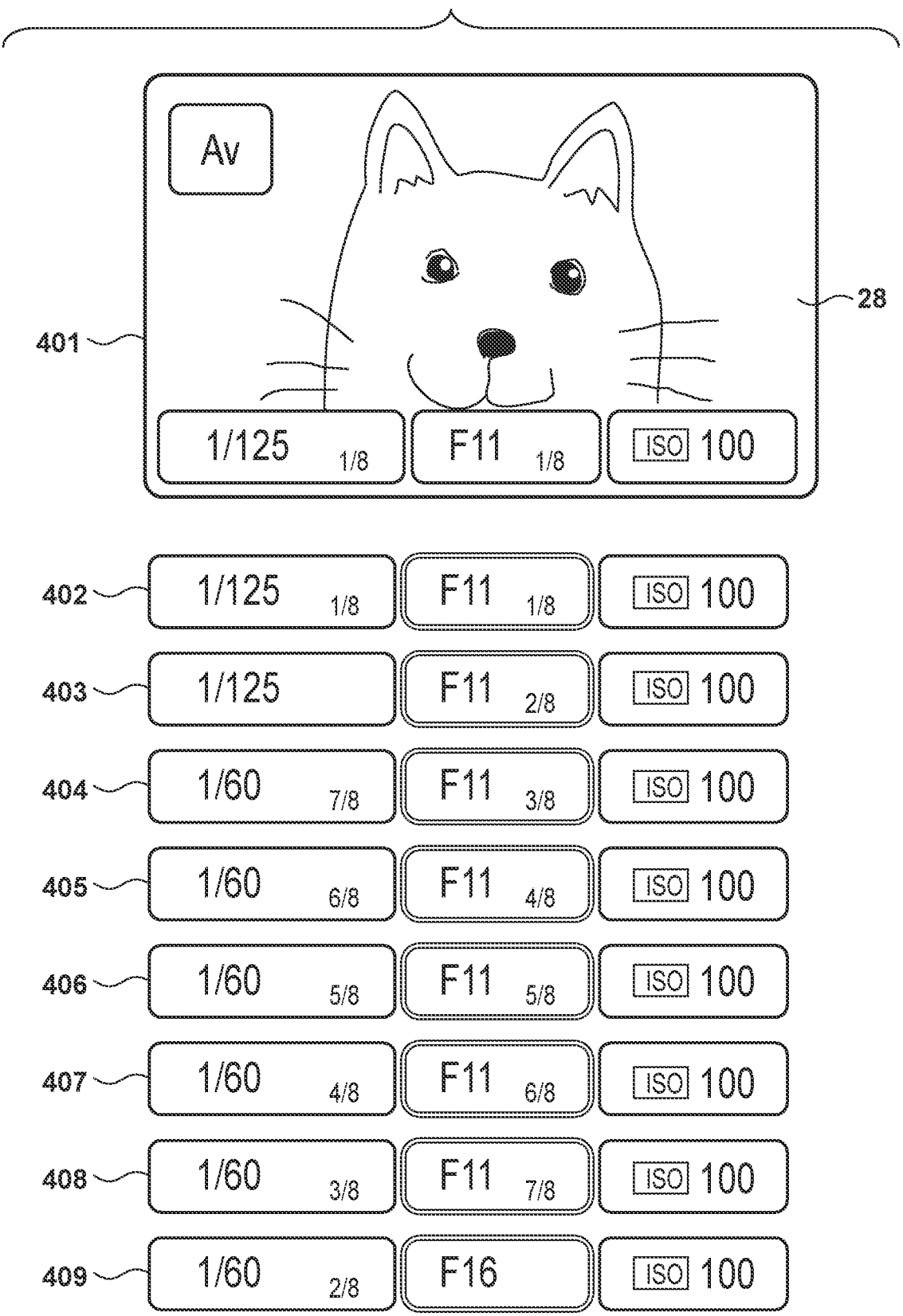
FIG. 4 is a diagram illustrating a display format in step S307 of FIG. 3A1 and step S328 of FIG. 3B1.

The display format in step S307 of FIG. 3A1 will be described next with reference to FIG. 4. FIG. 4 illustrates a photometry value display screen 401 displayed in the display unit 28. The photometry value display screen 401 includes a live view screen and an exposure parameter display superimposed on the LV image. The exposure parameter display includes the shutter speed (in seconds), the aperture setting value (F-number), and the ISO sensitivity value (ISO value). It is assumed here that the mode is Av priority mode, and the ISO is set to ISO 100.

An exposure parameter display 402 indicates the exposure parameter display extracted from the photometry value display screen 401, and includes the letter "F", which indicates the F-number, as well as "11" and the fraction "⅛", which indicate the F-number parameters. The unit indicated by the "11" part is not "stops" (i.e., does not indicate 11 stops), but rather indicates the value of the F-number itself, i.e., F11. The fraction "⅛" indicates "stops", and thus indicates a state in which the F-number has been reduced by ⅛ stop from F11. In other words, "F11⅛" does not indicate "F11.125", but instead indicates "F11 and ⅛ stop". As illustrated in FIG. 4, the fraction part indicating ⅛-stop increments is displayed at a smaller size than the integer part, with one character's worth of space therebetween.

If the F-number corresponding to "11⅛" is expressed as a setting value with two significant figures, rather than using a fraction, the F-number will remain F11, and thus cannot be distinguished from the state in effect before reducing the F-number by ⅛ stop from F11. Although this distinction can be made if more significant figures are used, doing so will result in an F-number different from the values users are accustomed to seeing, namely one stop, ½ stop, or ⅓-stop increments, which makes it difficult for users to intuitively understand the state of the aperture. In the example of FIG. 4, the stop is expressed by adding the fraction "⅛" to the F-number in one-stop increments, namely 11, which users are accustomed to seeing, which makes it possible for users to intuitively understand the state of the aperture.

Likewise, the exposure parameter display 402 includes a fraction "⅛" along with "1/125" as the shutter speed. The "1/125" part is the value of the shutter speed itself, in units of seconds. That is, this means Tv (1/125) seconds. The unit indicated by the fraction "⅛" is not "seconds", but rather "stops", and this therefore indicates that the shutter speed is faster than Tv (1/125) by ⅛ stop. In other words, "1/125 ⅛" indicates that the shutter speed is "(1/125) seconds and ⅛ stop". As with the F-number, expressing the stop using the fraction "⅛" along with the shutter speed of "1/125" in one-stop increments, which users are accustomed to seeing, makes it possible for users to intuitively understand the shutter speed.

In the following descriptions, a setting value that expresses the stop as a fraction may be referred to as "(exposure control value in one-stop increments)+(fraction) stops". For example, in the state indicated by the exposure parameter display 402, the F-number is (F11)+(⅛) stop, and the shutter speed is Tv (1/125) seconds+(⅛) stop.

In the example of FIG. 4, it is assumed that the result of automatic exposure is a state in which the proper exposure is obtained at Tv (1/125) second+(⅛) stop, F(11)+(⅛) stop, and an ISO sensitivity of 100. To simplify the descriptions, it is assumed that the brightness of the subject does not change during the operation for changing the F-number described hereinafter.

An exposure parameter display 403 corresponds to a state where the aperture has been reduced by another ⅛ stop from the state indicated by exposure parameter display 402, for an F-number of F11+⅖ stop. As a result of the F-number increasing by ⅛ stop, the shutter speed is slower by ⅛ stop, and is therefore exactly (1/125) seconds. No fraction is displayed for the shutter speed at this time. In other words, no fraction is displayed when there is no shift by ⅛-stop increments relative to the setting value set in one-stop increments. If, for example, the F-number corresponding to "11⅖" is expressed as a setting value with two significant figures, rather than using a fraction, the F-number will be F12, which is an F-number different from the values users are typically accustomed to seeing, namely one stop, ½ stop, or ⅓-stop increments. In the example of FIG. 4, the fraction "⅖" (stop) is added to the F-number of F11, which users are accustomed to seeing, which makes it possible for users to intuitively understand the state of the aperture.

Note that the digital camera 100 may be configured so that even if there is no shift by ⅛-stop increments relative to the setting value set in one-stop increments, a fraction such as "0/8" or "8/8" may be displayed to indicate that the stop setting for changing the F-number is ⅛-stop increments. In this case, the shutter speed in the exposure parameter display 403 is "1/125 0/8" or "1/60 8/8".

An exposure parameter display 404 corresponds to a state where the aperture has been reduced by another ⅛ stop from the state indicated by exposure parameter display 403. In this case, too, the setting value is expressed not as F13, but rather as F11+⅜ stop. Likewise, the shutter speed is expressed as Tv 1/60+⅞.

An exposure parameter display 405 corresponds to a state where the aperture has been reduced by another ⅛ stop from the state indicated by exposure parameter display 404. In this case, too, the setting value is expressed not as F13, but rather as F11+⅘ stop. Likewise, the shutter speed is expressed as Tv 1/60+⅝.

In the same manner, exposure parameter displays 406 to 408 correspond to states where the aperture has been progressively reduced from the state in exposure parameter display 405 in ⅛-stop increments, and the F-numbers and shutter speeds are expressed using fractions.

An exposure parameter display 409 corresponds to a state where the aperture has been reduced by another ⅛ stop from the state indicated by exposure parameter display 408. At this time, the F-number is exactly 16, and thus no fraction is displayed, as with the shutter speed in the exposure parameter display 403. However, the digital camera 100 may be configured so as to display "16 0/8" or "11 8/8", like the shutter speed in exposure parameter display 403.

The display format in step S307 of FIG. 3A1 (a display format used when an operation for changing the F-number in ⅛-stop increments has been made in Av priority mode) has been described with reference to FIG. 4, but the exposure parameter display is carried out using the same display format in step S328 of FIG. 3B1. It is assumed that the shutter speed is changed in ⅛-stop increments while in Tv priority mode, in step S327 of FIG. 3B1. In this case, in step S328 of FIG. 3B1, the shutter speed is displayed using fractions in the same manner as with the exposure parameter displays 402 to 409 illustrated in FIG. 4.

Figure 5:
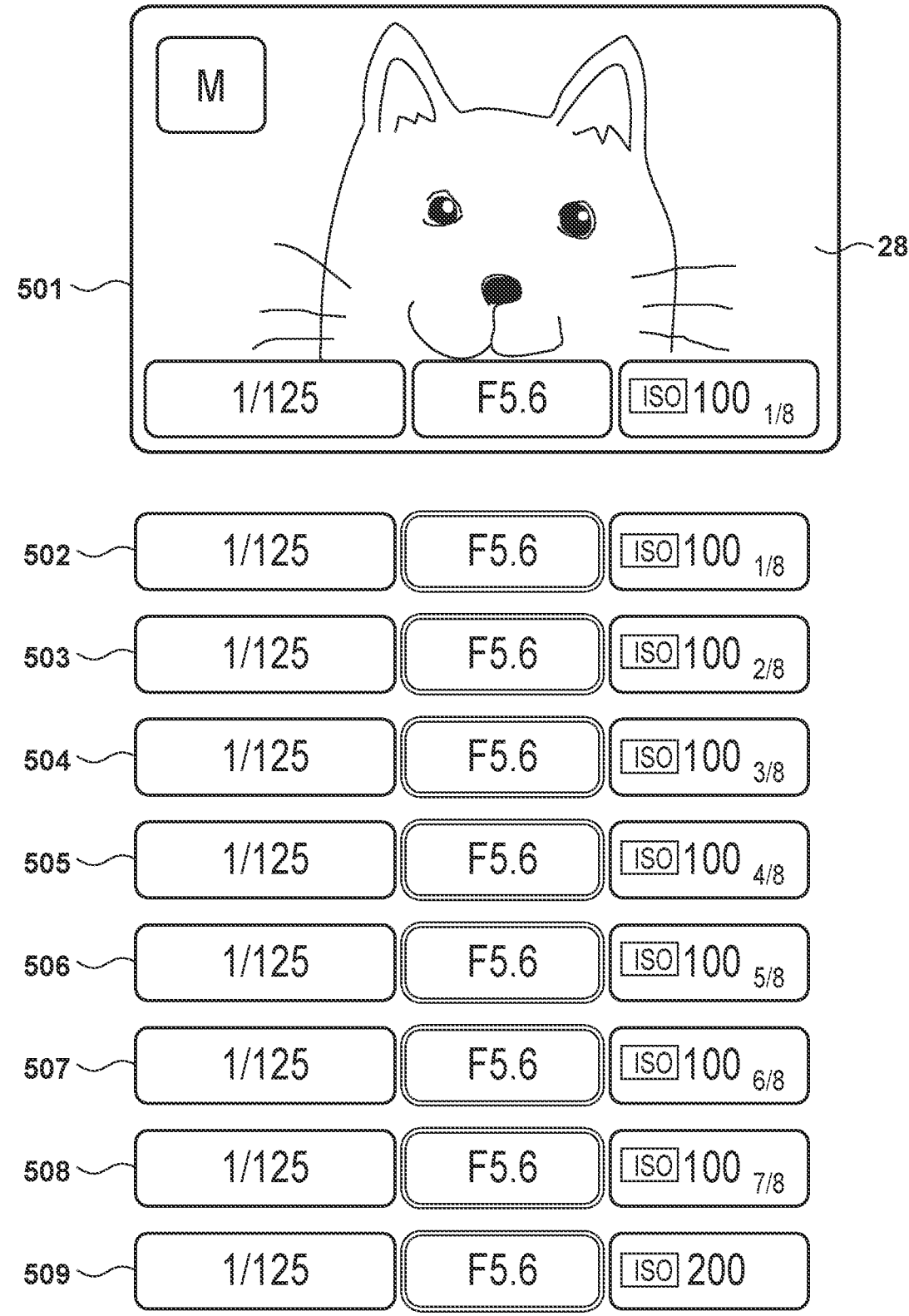
FIG. 5 is a diagram illustrating a display format in step S319 of FIG. 3A2.

The ISO value is displayed using fractions in step S319 of FIG. 3A2 as well. The display format in step S319 of FIG. 3A2 will be described next with reference to FIG. 5. FIG. 5 illustrates a photometry value display screen 501 displayed in the display unit 28. The photometry value display screen 501 includes an LV image and an exposure parameter display superimposed on the LV image. The exposure parameter display includes the shutter speed (in seconds), the aperture setting value (F-number), and the ISO sensitivity value (ISO value). Here, it is assumed that the ISO value is changed in ⅛-stop increments while in manual mode (M mode).

An exposure parameter display 502 indicates the exposure parameter display extracted from the photometry value display screen 501, and includes "100" as an ISO value and a fraction of "⅛". The "100" part is the ISO value itself, and thus means "ISO 100". The fraction "⅛" indicates a state in which the ISO value has been increased by ⅛ stop from ISO 100. As with the F-number and shutter speed described with reference to FIG. 4, the fraction "⅛" is added to the ISO value of "100", which users are accustomed to seeing, which makes it possible for users to intuitively understand the ISO value.

Exposure parameter displays 503 to 508 correspond to states where the ISO value has been progressively increased from the state in exposure parameter display 502 in ⅛-stop increments, and the ISO values are expressed using fractions.

An exposure parameter display 509 corresponds to a state where the ISO value has been increased from the state in exposure parameter display 508 by another ⅛ stop. At this time, the ISO value is exactly 200, and thus no fraction is displayed. However, the digital camera 100 may be configured so as to display "200 0/8" or "100 8/8", like the shutter speed in exposure parameter display 403 illustrated in FIG. 4.

In this manner, the digital camera 100 displays the setting values for the exposure control parameters (the aperture setting value, the shutter speed, and the ISO value) in values (where the unit is not "stops") in one-stop increments and fractions (where the unit is "stops") in ⅛-stop increments, which users are accustomed to seeing. This makes it possible for users to intuitively understand the setting values for the exposure control parameters. Additionally, users can make changes to the exposure control parameters intuitively and quickly. For example, if fractions are not used, the ISO value in the exposure parameter display 504 will be "130", and the ISO value in the exposure parameter display 508 will be "180". Here, consider a case where a user wishes to increase the ISO value by ½ stop from ISO 130. In this case, it is necessary for the user to rotate the main electronic dial 71 by four units while pressing the set button 75. "130" and "180" are not ISO values users are accustomed to seeing, and it is therefore difficult for the user to recognize that the ISO value has increased by ½ stop when the ISO value display changes from "130" to "180". Accordingly, it is necessary for the user to accurately count the number of times the main electronic dial 71 has been operated to increase the ISO value by ½ stop. However, if the display format illustrated in FIG. 5 is employed, it is easy for the user to recognize that the ISO value has increased by ½ stop when the ISO value display changes from "100⅜" to "100⅞", or in other words, when the fraction has increased by 4/8. As a result, the user can intuitively and quickly change ISO value without needing to accurately count the number of times the main electronic dial 71 has been operated.

In the examples of FIGS. 4 and 5, the denominators of the fractions displayed are 8, and the fractions are displayed in unreduced states even when reduction is possible. However, the fractions may be displayed in reduced states when the fractions can be reduced. For example, the F-number in the exposure parameter display 405 of FIG. 4 may be displayed as "11½".

Additionally, the F-numbers that can be set by the digital camera 100 in step S306 of FIG. 3A1 are not limited to those illustrated in FIG. 4. FIG. 6 is a diagram illustrating an example of F-numbers that can be set in the digital camera 100 in step S306, and a display format in step S307. Although FIG. 6 does not illustrate setting values shifted by ⅖ stop, ⅜ stop, ⅝ stop, ⅝ stop, and ⅞ stop from the F-number in one-stop increments, those values can also be set in the digital camera 100.

Likewise, the ISO values that can be set by the digital camera 100 in step S318 of FIG. 3A2 are not limited to those illustrated in FIG. 5. FIG. 7 is a diagram illustrating an example of ISO values that can be set in the digital camera 100 in step S318, and a display format in step S313. Although FIG. 7 does not illustrate setting values shifted by ⅖ stop, ⅜ stop, ⅝ stop, ⅝ stop, and ⅞ stop from the ISO value in one-stop increments, those values can also be set in the digital camera 100.

Likewise, the shutter speeds that can be set by the digital camera 100 in step S327 of FIG. 3B1 are not limited to those illustrated in FIG. 4. FIGS. 8A and 8B are diagrams illustrating an example of shutter speeds that can be set in the digital camera 100 in step S327, and the display format in step S328. Although FIGS. 8A and 8B do not illustrate setting values shifted by ⅖ stop, ⅜ stop, ⅝ stop, ⅝ stop, and ⅞ stop from the shutter speed in one-stop increments, those values can also be set in the digital camera 100.

A display format of the exposure control parameters in a case where the stop setting is not in ⅛-stop increments will be described next.

FIGS. 9, 10, and 11 are diagrams illustrating examples of F-numbers that can be set in the digital camera 100 in step S309, step S312, and step S314 of FIG. 3A1, and display formats in step S310, step S313, and step S315 of FIG. 3A1, respectively.

FIGS. 12 and 13 are diagrams illustrating examples of ISO values that can be set in the digital camera 100 in step S321 and step S323 of FIG. 3A2, and display formats in step S322 and step S324 of FIG. 3A2, respectively.

FIGS. 14, 15A, 15B, and 16 are diagrams illustrating examples of shutter speeds that can be set in the digital camera 100 in step S330, step S333, and step S335 of FIG. 3B1, and display formats in step S331, step S334, and step S336 in FIG. 3B1, respectively.

As indicated in FIGS. 9 to 13, the "display format" columns (fields) are displayed using integers or decimals rather than using fractions (in units of "stops"). Additionally, in FIGS. 14 to 16, the "display format" columns (fields) are displayed using fractions, but in units of "seconds" rather than "stops". In other words, the display does not use fractions in units of "stops". In this manner, if the stop setting is greater than ⅛-stop increments, the overall setting values for the exposure control parameters are displayed as the exposure control parameter values, rather than being displayed as a stop.

Although the descriptions given thus far assume that a display expressing the stop is carried out in the case where the stop setting is in ⅛-stop increments, the digital camera 100 may be configured so as to display the stop when the stop setting is lower than ⅛-stop increments. To generalize, the digital camera 100 displays the stop when the stop setting is in 1/n-stop increments (where n is an integer greater than or equal to 8), and does not display the stop when the stop setting is in 1/k-stop increments (where k is an integer greater than or equal to 1 and less than n). Although the present embodiment is particularly useful when n is an integer greater than or equal to 8, the same effect can be achieved to a certain extent even when n is an integer greater than or equal to 2. Accordingly, the digital camera 100 may be configured to display the stop when the stop setting is in 1/n-stop increments (where n is an integer greater than or equal to 2).

The display of the exposure control parameters in a format based on the stop setting, in step S303 of FIG. 3A1, will be described next. In step S303, the system control unit 50 displays the exposure control parameters in a display format based on the current stop setting (the stop setting following the switch in step S302). The specific display format is as described above with reference to FIGS. 4 to 16.

The following will describe operations carried out in step S303 when in step S302 the stop setting is switched between ⅛-stop increments and a unit aside from ⅛-stop increments.

For example, consider a situation where in the settings menu illustrated in FIG. 3C, "⅓ stop" is selected as the "exposure setting increment", "no" is selected as the "⅛ stop setting", and "14" is displayed as the F-number in the display unit 28. If in this state the "⅛ stop setting" is changed from "no" to "yes", the display format of the F-number changes from "14" to "11⅜" in the display unit 28. Note that F14 and F11+⅜ stop are not the same numerical value (equivalent values). In this state, the user has not yet carried out an operation for changing the aperture setting value, and thus internally, the setting value is still F14. However, the display format in the display unit 28 is changed to "11⅜" in ⅛-stop increments, which as described above is close to, but nevertheless different from, "F14". If in this state the "⅛ stop setting" is furthermore changed from "yes" to "no", the display format of the F-number changes from "11 4/8" to "F14" in the display unit 28.

As another example, consider a situation where in the settings menu illustrated in FIG. 3C, "½ stop" is selected as the "exposure setting increment", "no" is selected as the "⅛ stop setting", and "13" is displayed as the F-number in the display unit 28. If in this state the "⅛ stop setting" is changed from "no" to "yes", the display format of the F-number changes from "13" to "11 4/8" in the display unit 28. Although F13 and F11+4/8 are the same numerical values (equivalent values), the "⅛ stop setting" is set to "yes", and thus the notation in the display unit 28 is needlessly changed to "11 4/8". If in this state the "⅛ stop setting" is furthermore changed from "yes" to "no", the display format of the F-number changes from "11 4/8" to "13" in the display unit 28.

Although changes in the display format of the F-number in response to the stop setting being switched have been described here, the display formats of the ISO value and the shutter speed also change in the same manner in response to the stop setting being switched.

A variation on the display format of the exposure control parameters will be described next with reference to FIGS. 17 to 19.

Figure 17:
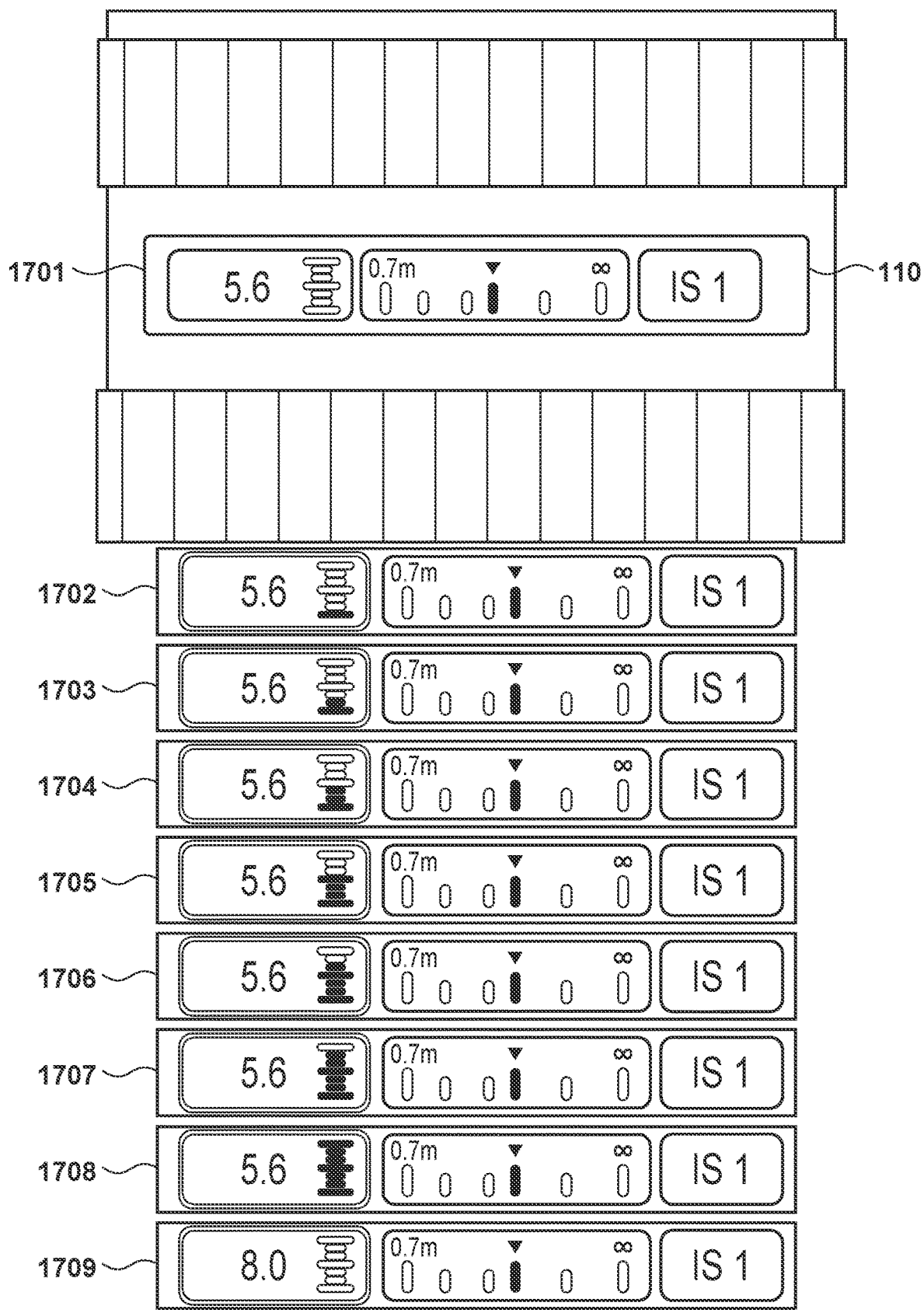
FIG. 17 is a diagram illustrating a display format of exposure control parameters displayed in a lens display unit 110 in step S307 of FIG. 3A1.

FIG. 17 is a diagram illustrating a display format of exposure control parameters displayed in the lens display unit 110 in step S307 of FIG. 3A1. In FIG. 17, the aperture setting value, a focal length index, and an optical image stabilization (IS) operating mode are displayed in the lens display unit 110. Reference signs 1702 to 1709 indicate changes in the displayed content from the displayed content indicated by reference sign 1701, resulting from operations for changing the F-number.

Reference sign 1702 indicates display content when the aperture has been reduced by ⅛ stop from the state indicated by reference sign 1701, which corresponds to F5.6. Because the lens display unit 110 is small, displaying a fraction corresponding to ⅛-stop increments as text, as per the exposure parameter display 402 illustrated in FIG. 4, results in poor visibility. Accordingly, the lens display unit 110 expresses ⅝ stop to ⅞ stop as dots having different horizontal lengths. Here, the one lowermost long dot being lighted indicates ⅛ stop. There are six long and short unlighted dots arranged above that dot. Although the outlines of the dots are emphasized here for descriptive purposes, in reality, the dots are only separated by narrow lines at the borders of liquid crystal segments, and thus the unlighted dots are not as visible as they appear in FIG. 17.

Reference sign 1703 indicates that the next (short) dot is lighted as well, expressing ⅖ stop. Reference sign 1704 indicates that the dots are lighted up to the third (short) dot, expressing ⅜ stop. Reference sign 1705 indicates that the dots are lighted up to the fourth (long) dot, expressing 4/8 stop. This dot is made long to make it easier to understand where the separation for ½ stop is located. Reference sign 1706 indicates that the dots are lighted up to the fifth (short) dot, expressing ⅝ stop. Reference sign 1707 indicates that the dots are lighted up to the sixth (short) dot, expressing 6/8 stop. Reference sign 1708 indicates that the dots are lighted up to the seventh (long) dot, expressing ⅞ stop. At this point, the ⅛ stop increment dots are fully displayed, and if the aperture is reduced by another ⅛ stop, the part of the F-number having a numerical value to which the user is accustomed to seeing will change, and thus a long dot is used. Reference sign 1709 indicates a state in which the F-number has increased to F8.0, and thus all the dots are extinguished.

Although FIG. 17 illustrates a display format used in the lens display unit 110, the same display format can be employed in other display units, such as the display unit 28, the in-viewfinder display unit 41, and the outside-viewfinder display unit 43. Additionally, although FIG. 17 illustrates a display format for the F-number, the same display format can be employed for the ISO value and the shutter speed. Different display formats may be used from display device to display device. For example, the displays illustrated in FIGS. 4 and 5 are used in the display unit 28, in which fractions can be displayed with good visibility. On the other hand, a display such as that illustrated in FIG. 17 is used in the lens display unit 110, the in-viewfinder display unit 41, and the outside-viewfinder display unit 43, in which fractions cannot easily be displayed with good visibility.

Figure 18:
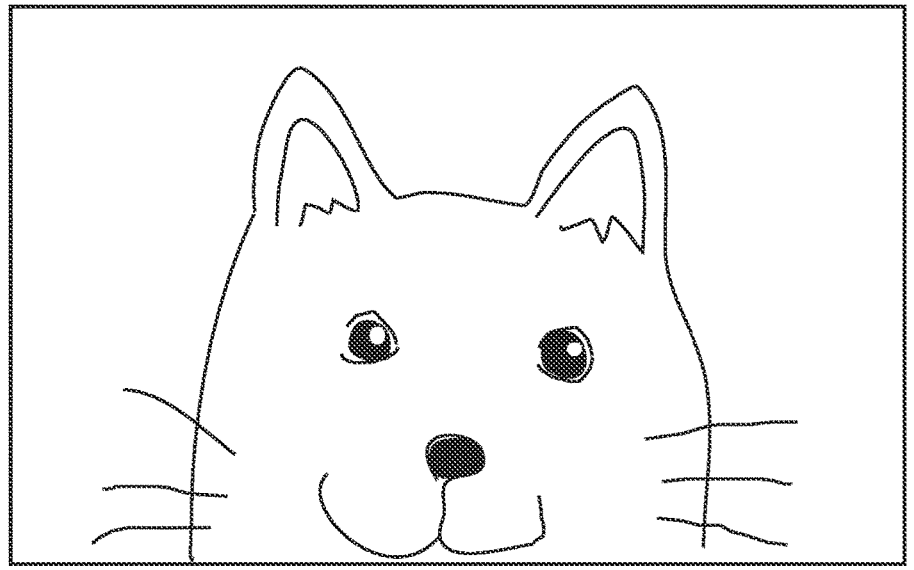
FIG. 18 is a diagram illustrating a display format of exposure control parameters displayed in an in-viewfinder display unit 41 in step S307 of FIG. 3A1.

FIG. 18 is a diagram illustrating a display format of exposure control parameters displayed in the in-viewfinder display unit 41 in step S307 of FIG. 3A1. The viewfinder described in the present embodiment is an optical viewfinder. The in-viewfinder display unit 41 is a liquid crystal display unit that is viewed superimposed over the optical image of the subject. In the present embodiment, the in-viewfinder display unit 41 is arranged so as to be visible in a lower part of the optical image of the subject. In the example illustrated in FIG. 18, a black mask is provided in the periphery of the optical image, and the display is provided in that black mask part. However, it is also possible to make the background transparent rather than black so that the optical image can be seen through that part, with the exception of lighted text or symbols. The in-viewfinder display unit 41 is not a dot-matrix display unit, and is therefore not capable of free-form display. Rather, various types of information are displayed by switching between lighting (displaying) and extinguishing (hiding) a plurality of display segments having predetermined shapes. Display parts for numbers are constituted by seven-segment display units ("7 SEG display units" hereinafter), and the shapes of numbers are displayed using lighted/extinguished patterns for the seven display elements segments). The denominator of the shutter speed, the aperture setting value, an exposure correction bar, an ISO icon, and the ISO value are displayed in that order from the left in the 7 SEG display units.

Reference sign 1801 indicates a state in which the shutter speed is ¼₀₀₀ seconds, the F-number is 5.6, exposure correction is 0, and the ISO value is 128000. Reference signs 1802 to 1809 indicate changes in the displayed content from the displayed content indicated by reference sign 1801, resulting from operations for changing the F-number. It is assumed here that the shutter speed is displayed in ½-stop increments.

Reference sign 1802 indicates display content when the aperture has been reduced by ⅛ stop from the state indicated by reference sign 1801, which corresponds to F5.6. At this time, the shutter speed is ¼₀₀₀ seconds and the F-number is F5.6+⅛ stop. The ISO icon is extinguished, and rather than displaying the ISO value, the six 7 SEG digits on the right side, used for displaying the ISO value, are instead used to express the fraction corresponding to ⅛-stop increments. The display of the inverted U-shape in reference sign 1802 indicates ⅛ stop.

Reference sign 1803 indicates a state in which the aperture is further reduced by ⅛ stop and the aperture setting value has become F5.6+⅖ stop (approximately F6.1), If all seven types of fractions, from ⅛ to ⅞, are to be expressed with the same inverted U-shape display indicated in reference sign 1802, seven 7 SEGs will be necessary, but there are only six 7 SEGs for displaying the ISO value. Accordingly, when expressing ⅖, only the lower segment in the left column is used in the second 7 SEG from the left, as indicated in FIG. 18.

Reference sign 1804 indicates a state in which the aperture is further reduced by ⅛ stop and the aperture setting value has become F5.6+⅜ stop (approximately F6.4). As illustrated in FIG. 18, ⅜ is expressed by furthermore lighting the lower segment in the right column in the second 7 SEG from the left.

Up to this point, the shutter speed is displayed in ½-stop increments, and therefore remains at 4000. The exposure correction is 0, and thus in terms of internal control, the shutter speed is ⅜ stop slower than ¼₀₀₀ seconds, corresponding to the F-number in ⅛-stop increments that has been manually set. However, this is displayed as being rounded to ½-stop increments in the display.

Reference sign 1805 indicates a state in which the aperture is further reduced by ⅛ stop and the aperture setting value has become F5.6±4/8 stop. Here, the inverted U-shape is displayed in the third 7 SEG from the left. In response to the F-number having been reduced ½ stop from the state indicated by reference sign 1801, the shutter speed has also changed in ½-stop increments to ⅟₃₀₀₀₀ seconds, and thus the display reads "3000".

In the same manner, reference signs 1806 to 1808 indicate display content when aperture value has been reduced ⅛ stop at a time from the state indicated by reference sign 1805. Although only one segment in the 7 SEGs is newly lighted in reference signs 1806 and 1807, the inverted U-shape is displayed by five segments in the 7 SEGs in reference sign 1808.

Reference sign 1809 indicates a state in which the aperture is further reduced by ⅛ stop and the aperture setting value has become F5.6+⅝ stop, i.e., F8.0. The shutter speed has also dropped by ½ stop, to ⅟₂₀₀₀₀ seconds.

By employing such a display format, seven types of fractions, from ⅛ to ⅞, can be expressed using six 7 SEGs.

Although FIG. 18 illustrates a display format for the F-number, the same display format can be employed for the ISO value and the shutter speed.

Additionally, although FIG. 18 illustrates a display format used in the in-viewfinder display unit 41, the same display format can be employed in other display units as well. This display format is particularly effective when applied in a display unit that displays using a seven-segment display unit or the like, rather than a dot-matrix display unit. Although a seven-segment display unit is sometimes employed in the outside-viewfinder display unit 43 or the lens display unit 110, is more effective to apply a display format such as that illustrated in FIG. 18 in those units. Unlike a single-lens reflex camera, in a digital camera such as a mirrorless camera, the viewfinder is often constituted by an electronic viewfinder that displays a captured LV image rather than an optical image. In such a case, a display format such as that illustrated in FIGS. 4 and 5 can be used rather than a display format such as that illustrated in FIG. 18, even for an in-viewfinder display unit (i.e., an EVF).

FIG. 19 is a diagram illustrating a display format of exposure control parameters displayed in the display unit 28 in step S307 of FIG. 3A1. It is assumed here that a camera setting value screen 1901 is displayed in the display unit 28 instead of the LV image in response to a user operation made in the operation unit 70.

The camera setting value screen 1901 includes an exposure meter providing an exposure meter index 1910. In the state illustrated in FIG. 19, the exposure meter index 1910 shows an appropriate exposure. In reality, the photometry result changes due to, for example, the camera panning and the composition changing as a result, the brightness of the subject changing, and so on, and thus the exposure meter index 1910 moves up and down at an updating frequency of approximately 100 ms.

If in this state an operation for increasing the F-number by ⅛ stop is carried out and the process of step S307 is executed, the display indicated by reference sign 1902 will be made in the camera setting value screen 1901 instead of the exposure meter. Reference sign 1902 indicates that the fraction part of the ⅛-stop increments for the F-number is ⅛. This display is continued for a prescribed amount of time (e.g., 500 ms). The exposure meter is displayed again once the prescribed amount of time has passed.

When operations for increasing the F-number by ⅛ stop at a time are made thereafter, the dots that are displayed increase as indicated by reference signs 1903 to 1905, expressing that the fraction part of the ⅛-stop increments for the F-number has increased to ⅖ and ⅜. In the state indicated by reference sign 1905, two dots arranged horizontally are newly lighted. This expresses the convenient number of ½ stop.

When operations for increasing the F-number by ⅛ stop at a time are made thereafter, the dots that are displayed increase as indicated by reference signs 1906 to 1908, ultimately producing the state indicated by reference sign 1909. The state indicated by reference sign 1909 shows that the F-number has reached a value corresponding to exactly a one stop increment.

Although FIG. 19 illustrates a display format for the F-number, the same display format can be employed for the ISO value and the shutter speed.

Additionally, a display format such as that illustrated in FIG. 19 can also be applied in a display unit having exposure correction display segments with predefined shapes, rather than in a dot-matrix display unit. In other words, the display format can be applied in a situation where the in-viewfinder display unit 41, the outside-viewfinder display unit 43, the lens display unit 110, or the like is a display unit having exposure correction display segments with predefined shapes rather than a dot-matrix display unit. In this case, the exposure control parameters are displayed in one-stop increments by numerical displays in seven-segment display units, and values for ⅛-stop increments, i.e., less than a single stop, are indicated using the exposure correction display segments. The exposure correction display segments often have seven indicators, with a state of no exposure correction (±0) in the center and exposure correction values of −3 to +3, which makes it possible to express exactly seven states, from ⅛ to ⅞. For example, when the exposure correction values are to be indicated one stop at a time, one of the seven indicators corresponding to the exposure correction values of −3 to +3 is displayed. When indicating parts corresponding to the ⅛-stop increments of the exposure control parameters (F-number, shutter speed, and ISO value) instead of displaying the exposure correction values, of the seven indicators corresponding to the exposure correction values of −3 to +3, only the numerators are displayed, in order from the left. For example, when indicating ⅜, the three indicators indicating the exposure correction values of −3, −2, and −1 are displayed simultaneously. Not only does this make it possible to express ⅜, but the display format is different from the exposure correction values, in which only one indicator is displayed, and it is therefore also possible to prevent the user from assuming that the content being displayed is not an exposure correction value and becoming confused.

As can be understood from FIGS. 17 to 19, the digital camera 100 may display some kind of indicator instead of a fraction in order to display parts of the setting values for the exposure control parameter, which are less than one stop, as a stop. For example, if the stop corresponding to a part of a setting value for the exposure control parameters, which is less than one stop, is m/n (where m is an integer greater than or equal to 1 and less than n), the digital camera 100 displays m indicators. The horizontally-long dots indicated in FIG. 17, the specific lighted patterns for 7 SEGs indicated in FIG. 18, the dots or combinations of two dots indicated in FIG. 19, and the like can be used as the indicator, for example.

The display format for exposure control parameters described thus far can also be applied in situations where the digital camera 100 is operated remotely.

Figure 20:
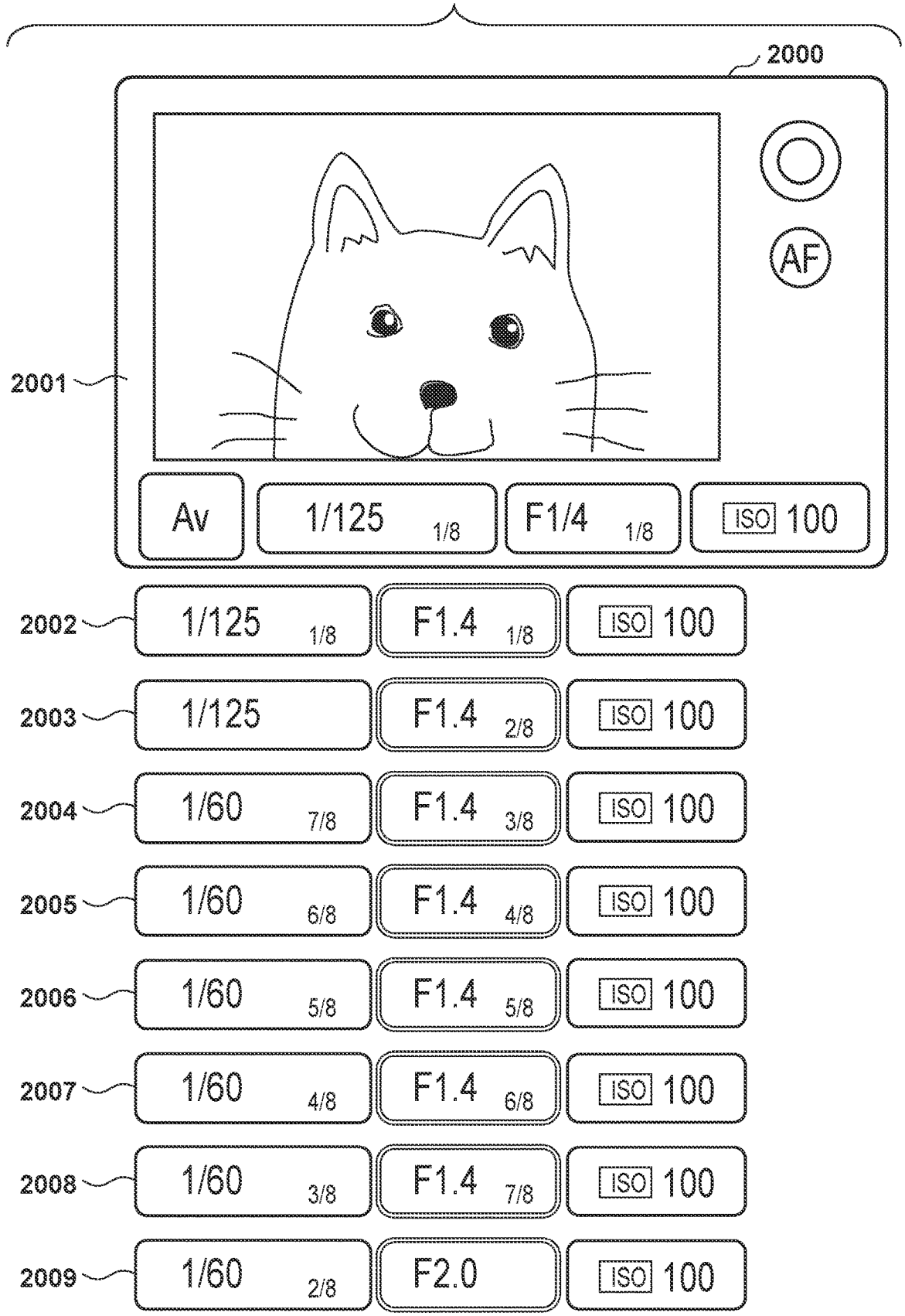
FIG. 20 is a diagram illustrating the digital camera 100 and a remote controller 2000 including a communication unit that communicates wirelessly or over a wire.

FIG. 20 is a diagram illustrating the digital camera 100 and a remote controller 2000 including a communication unit that communicates wirelessly or over a wire. A user can set (change) the exposure control parameters of the digital camera 100 via the communication unit of the remote controller 2000.

A photometry value display screen 2001 is displayed in a display of the remote controller 2000. An exposure parameter display 2002 indicates the exposure parameter display extracted from the photometry value display screen 2001, and the details thereof are the same as in the exposure parameter display 402 illustrated in FIG. 4. Likewise, exposure parameter displays 2003 to 2009 are the same as the exposure parameter displays 403 to 409 illustrated in FIG. 4.

According to the embodiment as described thus far, the digital camera 100 displays a setting value for exposure control parameters set in 1/n-stop increments as a numerical value in one-stop increments, and as a stop expression for a stop that is less than one stop. For example, in the display "F11⅛", the "11" part is a numerical value in one-stop increments, and the "⅛" part is a stop expression. Here, the numerical value in one-stop increments, which is displayed for the setting value for the exposure control parameters set in 1/n-stop increments, is the value, among the values that can be set in one-stop increments, that is closest while being less than or equal to the setting value that is set. For example, in the display "F11⅛", "11" is the value, of the F-numbers that can be set in one-stop increments (see FIG. 11), that is closest while being less than or equal to "F11⅛", which is the setting value that is set. In other words, a part of the setting value for the exposure control parameters, set in tin-stop increments, that is less than one stop, is displayed as a stop expression, and the remaining part in one-stop increments is displayed as a value of the exposure control parameters. This makes it possible for a user to intuitively understand the setting value. Here, although n is typically an integer of 8 or more, the present embodiment is also applicable in situations where n is an integer of from 2 to 7.

Note that the above-described various types of control performed by the system control unit 50 may be carried out by a single piece of hardware, or the control of the apparatus as a whole may be carried out by dividing the processing up among multiple pieces of hardware (e.g., multiple processors or circuits).

Although the foregoing has described a preferred embodiment of the present invention, the present invention is not intended to be limited to the specific embodiment, and all variations that do not depart from the essential spirit of the invention are intended to be included in the scope of the present invention. Furthermore, the above-described embodiment is merely one embodiment of the present invention, and different embodiments can be combined as appropriate.

Although the foregoing embodiment describes a case where the present invention is applied in the digital camera 100 as an example, the present invention is not limited to this example, and can also be applied in any electronic device capable of setting exposure control parameters. In other words, the present invention can be applied in personal computers and PDAs, mobile telephone terminals and portable image viewers, printer devices including displays, digital photo frames, music players, game consoles, e-book readers, and the like.

The present invention is not limited to an image capturing apparatus body, and can also be applied in a control apparatus that communicates with an image capturing apparatus (including a network camera) through wired or wireless communication and remotely controls the image capturing apparatus. A smartphone, a tablet PC, a desktop PC, and the like can be given as examples of apparatuses that remotely control the image capturing apparatus. The image capturing apparatus can be controlled remotely by the control apparatus communicating commands for carrying out various types of operations, settings, and the like to the image capturing apparatus on the basis of operations made in the control apparatus, processes carried out by the control apparatus, and the like. Additionally, a live view image shot by the image capturing apparatus may be received by the control apparatus through wired or wireless communication and displayed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-087543, filed Apr. 27, 2018 which is hereby incorporated by reference herein in its entirety.

What is claimed is:

1. An electronic device comprising a memory and at least one processor and/or at least one circuit to perform the operations of the following units:
   a setting unit configured to be able to set a setting value for at least one exposure control parameter among aperture, shutter speed, and ISO sensitivity in 1/n-stop increments (where n is an integer greater than or equal to 8); and
   a display control unit configured to carry out control so that the setting value for the exposure control parameter set in 1/n-stop increments is displayed as a numerical value in one-stop increments and a fraction serving as a stop expression indicative of a stop that is less than one stop,
   wherein a setting increment for the setting value for the exposure control parameter in the setting unit can be set to at least one of ½-stop increments and ⅓-stop increments, and
   the display control unit carries out control for displaying the setting value for the exposure control parameter set in ½-stop increments or ⅓-stop increments without using the stop expression indicative of a stop that is less than one stop, and
   wherein in a case where the setting value set when the setting increment is ½-stop increments or ⅓-stop increments is equal to the setting value set when the setting increment is 1/n-stop increments, the setting value is displayed without using the stop expression indicative of a stop that is less than one stop if the setting increment is ½-stop increments or ⅓-stop increments, and the setting value is displayed as a numerical value in one-stop increments and a fraction serving as a stop expression indicative of a stop that is less than one stop if the setting increment is 1/n-stop increments.

2. The electronic device according to claim 1,
   wherein the setting unit can also set the setting value for the exposure control parameter in one-stop increments; and
   the numerical value in one-stop increments, which is displayed for the setting value for the exposure control parameter set in 1/n-stop increments, is a value, among values that can be set in one-stop increments by the setting unit, that is closest while being less than or equal to the setting value.

3. The electronic device according to claim 1,
   wherein when the exposure control parameter set in 1/n-stop increments is a specific setting value, the display control unit carries out control for displaying the numerical value in one-stop increments of the specific setting value as a decimal, and displaying the stop expression of the specific setting value as a fraction.

4. The electronic device according to claim 3,
   wherein the exposure control parameter is an aperture setting value; and
   in a case where an F-number, corresponding to the aperture setting value set in 1/n-stop increments, is F1.4 and ½ stop, the display control unit carries out control for displaying the numerical value in one-stop increments of the specific setting value as 1.4, and displaying the stop expression of the specific setting value as ⅘.

5. The electronic device according to claim 4,
   wherein the memory and the at least one processor and/or the at least one circuit further perform the operation of a switching unit configured to switch a setting increment for the setting value for the exposure control parameter in the setting unit among a plurality of setting increments including ½-stop increments and the 1/n-stop increments, and
   wherein in a case where the aperture setting value set in the ½-stop increments is F1.4 and ½ stop, the display control unit carries out control so that 1.8 is displayed as an F-number indicating the aperture setting value.

6. The electronic device according to claim 1,
   wherein the display control unit carries out control for displaying the fraction indicative of a stop that is less than one stop without reducing the fraction, with n as the denominator.

7. The electronic device according to claim 1,
   wherein the memory and the at least one processor and/or the at least one circuit further perform the operation of a switching unit configured to switch the setting increment for the setting value for the exposure control parameter in the setting unit, and
   wherein in a case where the setting value for the exposure control parameter has been set in ½-stop increments or ⅓-stop increments and the setting increment of the setting unit is switched to 1/n-stop increments, the display control unit carries out control for changing a display format of the setting value from a display format used before switching the setting increment, without changing the setting value set in ½-stop increments or ⅓-stop increments, and displaying the setting value as a numerical value in one-stop increments and the stop expression indicative of a stop that is less than one stop.

8. The electronic device according to claim 1,
   wherein the exposure control parameter is an aperture setting value.

9. The electronic device according to claim 8,
   wherein the aperture setting value set in 1/n-stop increments is applied to moving image shooting, and
   an aperture setting value set in another setting increment is applied, without applying the aperture setting value set in 1/n-stop increments, to still image shooting.

10. The electronic device according to claim 1,
    wherein the exposure control parameter is shutter speed.

11. The electronic device according to claim 1,
    wherein the exposure control parameter is ISO sensitivity.

12. The electronic device according to claim 1,
    wherein the memory and the at least one processor and/or the at least one circuit further perform the operation of a communication unit configured to communicate with an image capturing apparatus that captures an image using the exposure control parameter, and
    wherein the communication unit sends, to the image capturing apparatus, the setting value set by the setting unit as the exposure control parameter for use in the image capturing apparatus.

13. The electronic device according to claim 1, further comprising:
    an image sensor configured to capture an image on a basis of the setting value set by the setting unit.

14. A control method of an electronic device, comprising:
    setting a setting value for at least one exposure control parameter among aperture, shutter speed, and ISO sensitivity in 1/n-stop increments (where n is an integer greater than or equal to 8);

carrying out control so that the setting value for the exposure control parameter set in 1/n-stop increments is displayed as a numerical value in one-stop increments and a fraction serving as a stop expression indicative of a stop that is less than one stop, wherein a setting increment for the setting value for the exposure control parameter in the setting unit can be set to at least one of ½-stop increments and ⅓-stop increments; and carrying out control for displaying the setting value for the exposure control parameter set in ½-stop increments or ⅓-stop increments without using the stop expression indicative of a stop that is less than one stop, wherein in a case where the setting value set when the setting increment is ½-stop increments or ⅓-stop increments is equal to the setting value set when the setting increment is 1/n-stop increments, the setting value is displayed without using the stop expression indicative of a stop that is less than one stop if the setting increment is ½-stop increments or ⅓-stop increments, and the setting value is displayed as a numerical value in one-stop increments and a fraction serving as a stop expression indicative of a stop that is less than one stop if the setting increment is 1/n-stop increments.

15. A non-transitory computer-readable storage medium which stores a program for causing a computer to execute a control method comprising:

setting a setting value for at least one exposure control parameter among aperture, shutter speed, and ISO sensitivity in 1/n-stop increments (where n is an integer greater than or equal to 8);

carrying out control so that the setting value for the exposure control parameter set in 1/n-stop increments is displayed as a numerical value in one-stop increments and a fraction serving as a stop expression indicative of a stop that is less than one stop, wherein a setting increment for the setting value for the exposure control parameter in the setting unit can be set to at least one of ½-stop increments and ⅓-stop increments; and carrying out control for displaying the setting value for the exposure control parameter set in ½-stop increments or ⅓-stop increments without using the stop expression indicative of a stop that is less than one stop, wherein in a case where the setting value set when the setting increment is ½-stop increments or ⅓-stop increments is equal to the setting value set when the setting increment is 1/n-stop increments, the setting value is displayed without using the stop expression indicative of a stop that is less than one stop if the setting increment is ½-stop increments or ⅓-stop increments, and the setting value is displayed as a numerical value in one-stop increments and a fraction serving as a stop expression indicative of a stop that is less than one stop if the setting increment is 1/n-stop increments.

16. An electronic device comprising a memory and at least one processor and/or at least one circuit to perform the operations of the following units:

a setting unit configured to be able to set a setting value for at least one exposure control parameter among aperture, shutter speed, and ISO sensitivity in 1/n-stop increments (where n is an integer greater than or equal to 8); and a display control unit configured to carry out control so that the setting value for the exposure control parameter set in 1/n-stop increments is displayed as a numerical value in one-stop increments and a stop expression indicative of a stop that is less than one stop, wherein in a case where the stop less than one stop is m/n (where m is an integer greater than or equal to 1 and less than n), the display control unit carries out control so that m indicators are displayed as the stop expression, a setting increment for the setting value for the exposure control parameter in the setting unit can be set to at least one of ½-stop increments and ⅓-stop increments, and the display control unit carries out control for displaying the setting value for the exposure control parameter set in ½-stop increments or ⅓-stop increments without using the stop expression indicative of a stop that is less than one stop, and wherein in a case where the setting value set when the setting increment is ½-stop increments or ⅓-stop increments is equal to the setting value set when the setting increment is 1/n-stop increments, the setting value is displayed without using the stop expression indicative of a stop that is less than one stop if the setting increment is ½-stop increments or ⅓-stop increments, and the setting value is displayed as a numerical value in one-stop increments and a stop expression indicative of a stop that is less than one stop if the setting increment is 1/n-stop increments.

17. A control method of an electronic device, comprising:

setting a setting value for at least one exposure control parameter among aperture, shutter speed, and ISO sensitivity in 1/n-stop increments (where n is an integer greater than or equal to 8);

carrying out control so that the setting value for the exposure control parameter set in 1/n-stop increments is displayed as a numerical value in one-stop increments and a stop expression indicative of a stop that is less than one stop, wherein in a case where the stop less than one stop is m/n (where m is an integer greater than or equal to 1 and less than n), m indicators are displayed as the stop expression, and wherein a setting increment for the setting value for the exposure control parameter can be set to at least one of ½-stop increments and ⅓-stop increments; and carrying out control for displaying the setting value for the exposure control parameter set in ½-stop increments or ⅓-stop increments without using the stop expression indicative of a stop that is less than one stop, wherein in a case where the setting value set when the setting increment is ½-stop increments or ⅓-stop increments is equal to the setting value set when the setting increment is 1/n-stop increments, the setting value is displayed without using the stop expression indicative of a stop that is less than one stop if the setting increment is ½-stop increments or ⅓-stop increments, and the setting value is displayed as a numerical value in one-stop increments and a stop expression indicative of a stop that is less than one stop if the setting increment is 1/n-stop increments.

18. A non-transitory computer-readable storage medium which stores a program for causing a computer to execute a control method comprising:

setting a setting value for at least one exposure control parameter among aperture, shutter speed, and ISO sensitivity in 1/n-stop increments (where n is an integer greater than or equal to 8);

carrying out control so that the setting value for the exposure control parameter set in 1/n-stop increments is displayed as a numerical value in one-stop increments and a stop expression indicative of a stop that is less than one stop, wherein in a case where the stop less than one stop is m/n (where m is an integer greater than or equal to 1 and less than n), m indicators are displayed as the stop expression, and wherein a setting increment for the setting value for the exposure control parameter can be set to at least one of ½-stop increments and ⅓-stop increments; and carrying out control for displaying the setting value for the exposure control parameter set in ½-stop increments or ⅓-stop increments without using the stop expression indicative of a stop that is less than one stop, wherein in a case where the setting value set when the setting increment is ½-stop increments or ⅓-stop increments is equal to the setting value set when the setting increment is 1/n-stop increments, the setting value is displayed without using the stop expression indicative of a stop that is less than one stop if the setting increment is ½-stop increments or ⅓-stop increments, and the setting value is displayed as a numerical value in one-stop increments and a stop expression indicative of a stop that is less than one stop if the setting increment is 1/n-stop increments.

* * * * *